(12) United States Patent
Sengodan

(10) Patent No.: US 7,290,248 B2
(45) Date of Patent: *Oct. 30, 2007

(54) COMMAND-LINE INTERFACE SYSTEM AND METHOD FOR JAVA MESSAGE SERVICE MARK-UP LANGUAGE

(75) Inventor: Kathiravan Sengodan, Edison, NJ (US)

(73) Assignee: BEA Systems, Inc., San Jose, CA (US)

( * ) Notice: Subject to any disclaimer, the term of this patent is extended or adjusted under 35 U.S.C. 154(b) by 700 days.

This patent is subject to a terminal disclaimer.

(21) Appl. No.: 10/601,929

(22) Filed: Jun. 23, 2003

(65) Prior Publication Data

US 2004/0148569 A1 Jul. 29, 2004

Related U.S. Application Data

(60) Provisional application No. 60/442,780, filed on Jan. 27, 2003.

(51) Int. Cl.
*G06F 9/45* (2006.01)
*G06F 3/00* (2006.01)

(52) U.S. Cl. ........................... 717/136; 719/313
(58) Field of Classification Search ........ 717/100–109, 717/136
See application file for complete search history.

(56) References Cited

U.S. PATENT DOCUMENTS

| | | | |
|---|---|---|---|
| 6,199,195 B1* | 3/2001 | Goodwin et al. ........... 717/104 |
| 6,317,748 B1* | 11/2001 | Menzies et al. ........ 707/103 X |
| 6,738,975 B1 | 5/2004 | Yee et al. |
| 6,753,889 B1* | 6/2004 | Najmi ........................ 715/784 |
| 6,874,020 B1 | 3/2005 | Da Palma et al. |
| 6,876,733 B2 | 4/2005 | Creamer et al. |
| 6,915,519 B2 | 7/2005 | Williamson et al. |
| 6,922,695 B2 | 7/2005 | Skufca et al. |
| 7,043,684 B2 | 5/2006 | Joly |
| 7,065,744 B2* | 6/2006 | Barker et al. ................ 717/109 |
| 7,103,627 B2 | 9/2006 | Kittredge et al. |
| 7,124,299 B2 | 10/2006 | Dick et al. |
| 2002/0069275 A1* | 6/2002 | Tindal ......................... 709/223 |
| 2003/0133552 A1 | 7/2003 | Pillai et al. |
| 2003/0177477 A1* | 9/2003 | Fuchs ......................... 717/136 |

OTHER PUBLICATIONS

JAVA <Message Service API-FAQ, retrieved from <URL http://java.sun.com/products/jms/faq.html> on Oct. 30, 2006 google.com search.*

Aleksy, Markus; Schader, Martin; Schnell, Alexander; "Design and Implementation of a Bridge Between CORBA's Notification Service and the JAVA Message Service", 2002 IEEE, retrieved from scholar.google.com search Oct. 25, 2006.*

(Continued)

*Primary Examiner*—Mary Steelman
(74) *Attorney, Agent, or Firm*—Fliesler Meyer LLP

(57) ABSTRACT

A command-line interface for using a mark-up language (JMSML) to access JMS/JMX interfaces. The invention comprises a system including a Java stand alone client, acting as the command line interface to execute the JMSML program. The user can specify the JMSML program name, location along with the server's connection information (for example the URL) as command line parameters. This interface then validates these parameters and executes the given JMSML program. This interface requires the JMSML engine JAR file in the CLASSPATH of the user's execution environment.

13 Claims, 19 Drawing Sheets

OTHER PUBLICATIONS

Chu, Chi-Hsing; Huang, Chien-Hsuan; Lee, Michael; "Building a XML-Based Unified User Interface System under J2EE Architecture", retrieved from www.scholar.google.com Oct. 25, 2006.*
U.S. Appl. No. 10/602,037, filed Jun. 23, 2003, Sengodan.
U.S. Appl. No. 10/601,898, filed Jun. 23, 2003, Sengodan.
U.S. Appl. No. 10/602,038, filed Jun. 23, 2003, Sengodan.
BEA Systems, Inc., BEA WebLogic Server and WebLogic Express—Administration Guide Release 7.0, Table of Contents and Chapter 1 entitled "Overview of WebLogic System Administration", 2002.
BEA Systems, Inc., BEA WebLogic Server—Developing WebLogic Server Applications Release 7.0, Table of Contents and Chapter 1 entitled "Understanding WebLogic Server J2EE Applications", 2002.
BEA Systems, Inc., BEA WebLogic Server—BEA WebLogic Server Configuration Reference Release 7.0, Table of Contents and Chapter 1 entitled "Overivew of config.xml", 2003.
Extensible Markup Language (XML) 1.0, http://www.w3.org/TR/1998/REC-xml-19980210, printed Sep. 18, 2003.
Java Technology and XML, http://java.sun.vom/xml/ printed Sep. 18, 2003.
Java Management Extensions (JMX) Home Page, http://java.sun.com/products/JavaManagement/, printed Sep. 18, 2003.
Java Management Extensions White Paper entitled "Dynamic Management for the Service Age", http://java.sun.com/products/JavaManagement/wp/, printed Sep. 18, 2003.
JSR-000003 Java (tm) Management Extensions (JMXTM)—Final Release Specification, http://jcp.org/aboutJava/communityprocess/final/jsr003/index.html , printed on Sep. 18, 2003.
Java Message Service API, http://java.sun.com/products/jms/ , printed on Sep. 18, 2003.
Chiao, Hsin-Ta; Lin, Chun-Han; Liang, Kai-Chih, Yuan, Shyan-Ming, "The Experience of Using Java-Based Message-Oriented Middleware to Build a Distributed Training Simulator", 2002, IEEE, retrieved Nov. 7, 2006.
Kiniry, Joseph; Zimmerman, Daniel, "A Hands-On Look at Java Mobile Agents", pp. 21-30, 1997 IEEE, retrieved Nov. 7, 2006.
Tai, Stefan; Rouvellou, Isabelle, "Strategies for Integrating Messaging and Distributed Object Transactions", pp. 308-330, Middeleware 2000, LNCS 1795, retrieved from ACM Portal Database Nov. 7, 2006.
"Java Dynamic Management Kit", retrieved from <URL http://sun.com/software/jdmk/index.xml>, retrieved Nov. 8, 2006.

* cited by examiner

COMMAND-LINE INTERFACE SYSTEM AND METHOD FOR JAVA MESSAGE SERVICE MARK-UP LANGUAGE

CLAIM OF PRIORITY

This application claims the benefit of U.S. Provisional Application No. 60/442,780, filed Jan. 27, 2003, and is incorporated herein by reference.

CROSS-REFERENCES

This application is related to co-pending U.S. Utility patent application Ser. No. 10/602,037 by Kathiravan Sengodan entitled "SYSTEM AND METHOD FOR JAVA MESSAGE SERVICE MARK-UP LANGUAGE", filed Jun. 23, 2003 (BEAS-01351US1), U.S. Utility patent application Ser. No. 10/601,898 by Kathiravan Sengodan entitled "WEB-BASED INTERFACE FOR JAVA MESSAGE SERVICE MARK-UP LANGUAGE", filed Jun. 23, 2003 (BEAS-01351US2), and U.S. Utility patent application Ser. No. 10/602,038 by Kathiravan Sengodan entitled "INTEGRATED DEVELOPMENT ENVIRONMENT FOR JAVA MESSAGE SERVICE MARK-UP LANGUAGE", filed Jun. 23, 2003 (BEAS-01351US4), which applications are also incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to the Java Message Service (JMS) and Java Management Extensions (JMX), and particularly to a command-line interface for using a mark-up language to access JMS/JMX interfaces.

BACKGROUND

In a business enterprise environment, the JAVA 2 Enterprise Edition (J2EE) platform is often used to build distributed transactional applications for the enterprise. To allow for rapid application design, the J2EE platform provides a component-based approach to the design, development, assembly and deployment of enterprise applications. The J2EE platform offers a multi-tiered distributed application model, and the ability to reuse components. In a multi-tiered distributed application model, application logic is divided into components according to their function. The components are themselves often physically divided among separate machines depending on their association to a certain J2EE environment tier. Communication for the purpose of coordination between physically and logically distinct components of an enterprise application is therefore a complex task.

The JAVA Message Service (JMS) API was introduced primarily for the purpose of allowing JAVA applications to interact with messaging-oriented middleware (MOM) systems such as IBM's MQSeries and Peerlogic's PIPES software. Today, JMS has largely replaced such MOM systems and many vendors have adopted and implemented the JMS API. JMS has become increasingly robust and currently offers such features as the capability for any application client, Enterprise JAVABean (EJB) or Web component to synchronously send and/or receive a JMS message. Application client components can also receive JMS messages asynchronously. A unique type of EJB, the message-driven bean, extends the capability for asynchronous JMS message consumption to other enterprise components. Generally, the JMS API simplifies inter-component communication by enabling loosely coupled asynchronous communication across the board between J2EE components individually and also between legacy system messaging implementations and J2EE components considered collectively.

Frequently, a JMS based application development requires configuring and managing certain JMS components on the server side like JMS Connection Factories, JMS Destinations etc., as well as designing application clients capable of interacting with the server-side components. Application clients utilizing JMS functionality can be categorized as producers, consumers, or both. Producer-type application clients are responsible for creating various JMS message types (such as text, XML, objects, streams and bytes) and relaying them to JMS destinations (such as queues and topics). Consumer-type application clients may subsequently receive messages from these destinations in either synchronous or asynchronous fashion.

Message producers and consumers communicate using either the "Point-to-Point" or the "Publish-Subscribe" messaging model. The chief characteristic of the "Point-to-Point" model is a one-to-one relationship between messages sent by message producers and message consumers. The JMS API achieves this by using queue destinations. A single message may be enqueued by at most one message producer, and may be dequeued by at most one consumer. The "Publish-Subscribe" model differs in that a one-to-many relationship exists between message producers and consumers. Messages are routed through "Topic" destinations. A single message may be published into the topic by, at most, one message producer, yet may be retrieved by a plurality of message consumers. Most implementations of the JMS API support each of the "Point-to-Point" and the "Publish/Subscribe" messaging methodologies, as well as combinations of the two, further easing issues of integration with legacy messaging products.

The JAVA Management Extensions (JMX) comprise a set of specifications and development tools for managing JAVA environments, and for building third-generation Operation, Administration and Management/Monitoring (OAM) solutions. It specifies management architecture and APIs, as well as basic management services. JMX offers a tiered architecture into which managed resources and management applications can be integrated in a plug-and-play manner.

The standard JMX architecture is composed of 3 tiers—the instrumentation level, the agent level, and the manager level, often referred to as the "distributed services level". The instrumentation level typically contains objects of broad interest to developers generally. The agent level provides management agents which are containers that provide core management services which are capable of being extended by adding other JMX resources. Finally, the manager level provides management components that operate as a manager or agent for distribution and consolidation of management services.

In application servers, such as BEA's WebLogic Server, JMX is extensively used for operation, administration and management of application server objects through interaction with Management Beans (also referred to as MBeans). WebLogic Server, for example, utilitizes "Config MBeans" and "Runtime MBeans" to configure and monitor server internals. "Config MBeans" represent the configuration information of a booted WebLogic Server. The application server creates a "Config MBean" for each element of the config.xml file and an administrator can modify the configuration of a running application server by simply interacting with the identified "Config MBean". A "Runtime MBean" is used for monitoring application server performance by maintaining state information on any variety of server statistics and an administrator may readily ascertain the desired information by interacting with the "Runtime MBean" using the functionality of the JMX API.

At a more granular level, the JMS and JMX APIs are themselves very complex, and the intricacies of both can be difficult to learn and use. Therefore, utilizing these APIs is often a tedious process, and is also sometimes confusing to novice programmers and developers. It is not uncommon for a developer to have to write long and complicated code to instantiate JMS objects, to facilitate interactions between JMS objects and to manage all of these objects and transactions. The computer instructions necessary to build similar but slightly different JMS objects and their usage often requires the programmer to rewrite essentially the same code multiple times for each object, resulting in wasted resources and a decrease in overall efficiency. A method and/or system that could be used for reducing the complexity of this process and for facilitating the Operation, Administration and Management/Monitoring and the usage of JMS objects would be of great benefit.

SUMMARY OF THE INVENTION

Generally described, the invention provides a markup language and associated tools for JMS (referred to herein as the JMS Markup Language or JMSML). JMSML is useful for creating simple and reusable JMS components for performing all of the JMX operations necessary for dynamic configuration, management and runtime monitoring of the JMS server, in addition to performing enterprise messaging using the JMS operations. Embodiments of the invention include systems and methods that abstract the complexity of the JMS and JMX APIs into a relatively small plurality of easy-to-use extensible Markup Language (XML) tags.

In accordance with one embodiment the invention comprises a system having an extensible engine that performs the task of parsing input data and converting it to an interface specification, such as JAVA JMS/JMX API, and then executes the JMSML program. In other embodiments the invention includes methods of using JMSML to access JMS/JMX APIs.

The terms JAVA, JAVA2 Enterprise Edition (J2EE), JAVA Message Service (JMS), Enterprise JAVA Bean (EJB), and JAVA Management Extensions (JMX), are trademarks of Sun Microsystems, Inc. The terms WebLogic, and WebLogic Server, are trademarks of BEA Systems, Inc.

DETAILED DESCRIPTION

Figure 1:
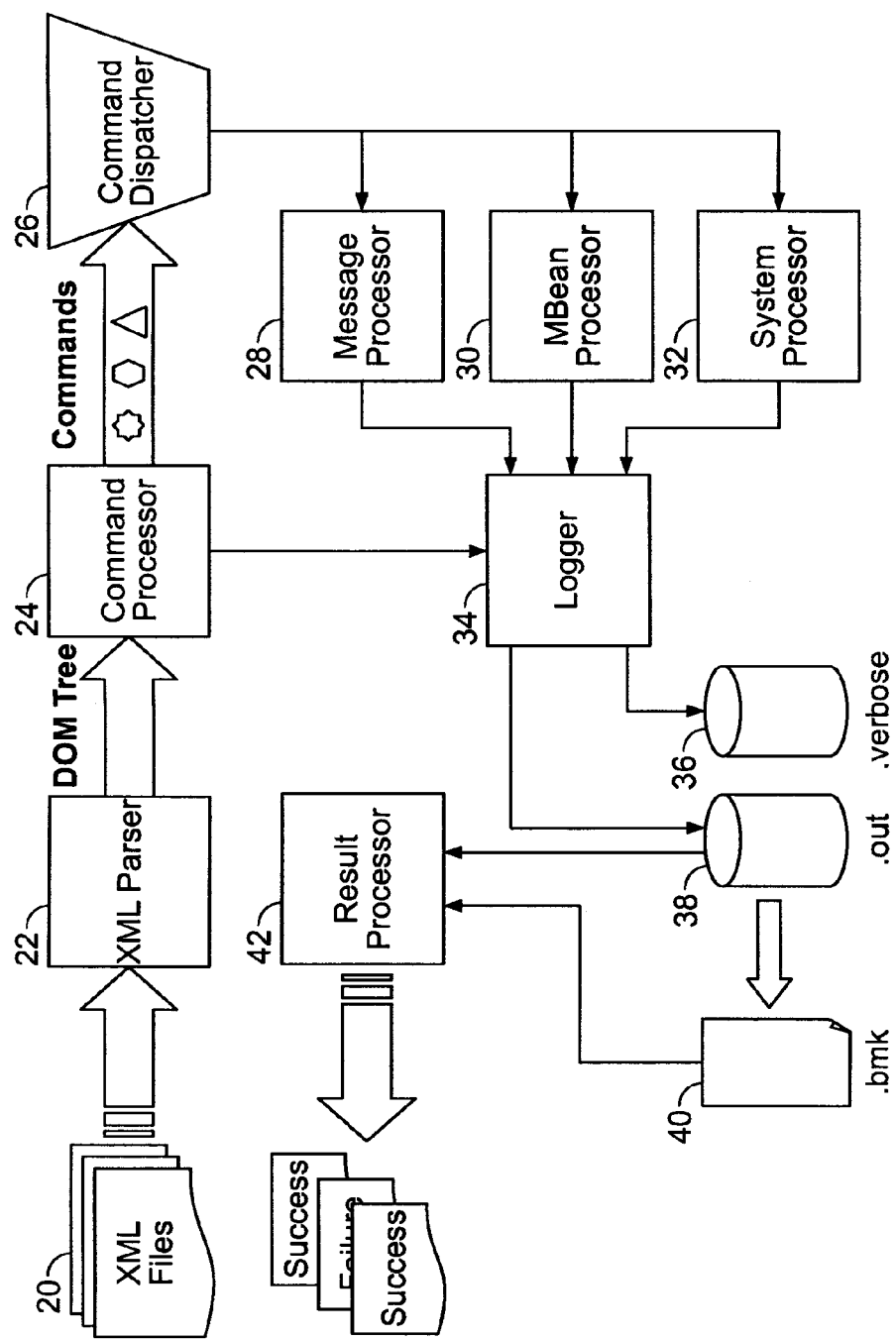
FIG. 1 shows a diagram of a system in accordance with an embodiment of the invention, and shows the components used by the JMSML engine to process a XML-formatted file containing JMSML-compliant tags.

An embodiment of the invention provides a markup language (referred to herein as JMSML), and user interfaces, that are useful for creating simple and reusable JMS components. The JMS components can be used for performing JMX operations necessary for dynamic configuration, management and runtime monitoring of a JMS server, in addition to performing enterprise messaging using the JMS operations. JMSML is a mark-up language designed and developed to make interface specification, such as JAVA Message Service (JMS) and JAVA Management Extensions (JMX) programming easy by hiding the JMS and JMX JAVA API complexity behind a few easy-to-use XML tags. Embodiments of the invention include systems and methods that utilize JMSML to abstract the complexity of the JMS and JMX APIs into a relatively small plurality of tags.

In accordance with one embodiment the invention comprises a system having an extensible engine that performs the task of parsing input data and converting it to an interface specification, such as JAVA JMS/JMX API, and then executes the JMSML program. In other embodiments the invention includes methods of using JMSML to access JMS/JMX APIs.

A typical JMS application development process involves configuring and managing the JMS server components, such as the JMSConnectionFactory, JMSDestination, etc., on the JMS Provider application server, and then writing JMS application clients that will make use of these administered server-side objects to perform JAVA messaging. JMS application clients are written in Java using the JMS API, and are categorized into two types of programs: Producers and Consumers. Producers create various JMS Message types (like Text, XML, Object, Stream, Bytes) and send them to the JMS destinations (Queues and Topics). Consumers receive the messages from the JMS destinations (Queues and Topics), both synchronously and asynchronously. The JMS API enables both producers and consumers to utilize various qualities of service (QOS) that are provided by the underlying JMS implementation and by the JMS providers (such as transaction, acknowledgment, etc.).

Creating producers and consumers in this manner involves following some specific steps, in a specific order, while using the JMS API. This process has to be repeated for every single producer and consumer that is written to use Java messaging. For example, in accordance with traditional methods, in order to use the JMS API to send the text message "Hello World" to a JMS queue named "exampleQueue" using a JMSConnectionFactory object named "QueueConnectionFactory" via a non-transacted, auto-acknowledge JMSSession, a JAVA program of such as that shown below may be required:

```
import java.util.*;
import javax.naming.*;
import javax.jms.*;
public class QueueSend
{
    public final static String
        JNDI_FACTORY="weblogic.jndi.WLInitialContextFactory";
    public final static String
        JMS_FACTORY="QueueConnectionFactory";
    public final static String QUEUE="exampleQueue";
```

-continued

```
    private QueueConnectionFactory qconFactory;
    private QueueConnection qcon;
    private QueueSession qsession;
    private QueueSender qsender;
    private Queue queue;
    private TextMessage msg;
    public void init(Context ctx, String queueName)
        throws NamingException, JMSException
    {
        qconFactory = (QueueConnectionFactory)
                ctx.lookup(JMS_FACTORY);
        qcon = qconFactory.createQueueConnection( );
        qsession = qcon.createQueueSession(false,
                        Session.AUTO_ACKNOWLEDGE);
        queue = (QUEUE) ctx.lookup(queueName);
        qsender = qsession.createSender(queue);
        msg = qsession.createTextMessage( );
        qcon.start( );
    }
    public void send(String message)
        throws JMSException
    {
        msg.setText(message);
        qsender.send(msg);
    }
    public void close( )
        throws JMSException
    {
        qsender.close( );
        qsession.close( );
        qcon.close( );
    }
    public static void main(String [] args)
        throws Exception
    {
        if (args.length != 1)
        {
            System.out.println("Usage: java QueueSend WebLogicURL");
            return;
        }
        InitialContext ic = getInitialContext(args [0]);
        QueueSend qs = new QueueSend( );
        qs.init(ic, QUEUE);
        qs.send("Hello World");
        qs.close( );
    }
    private static InitialContext getInitialContext(String url)
        throwsNamingException
    {
        Hashtable env = new Hashtable ( );
        env.put(Context.INITIAL_CONTEXT_FACTORY, JNDI_
            FACTORY);
        env.put(Context.PROVIDER_URL, url);
        return new InitialContext(env);
    }
```

As can be seen from the above example, using traditional methods the required Java program is quite long and complex. The JMSML approach to writing JMS application clients is accomplished without writing Java code using the JMS API. Instead, the entire JMS API complexity is abstracted into a few XML tags that are easy to use and remember. By using JMSML, a developer can create simple re-usable JMS components, such as a "Sender", "Receiver", "Publisher", and "Subscriber". JMSML makes administration of a JMS server very simple by using XML tags, thus eliminating the JMX Java API complexity. JMSML supports all the JMX operations that are needed to do dynamic configuration, management, and runtime monitoring of a JMS server. In accordance with one embodiment, use of the present invention significantly simplifies and shortens the length of the required code. As illustrated in FIG. 1, an XML file 20 is formatted with the JMSML-specific tags (described in further detail below). This file is then used to perform the necessary operations. An example of such an XML file which is analogous in operation to the JAVA code example shown above may be represented using JMSML as follows:

```
<?xml version="1.0" encoding="UTF-8"?>
<!DOCTYPE jmsml PUBLIC "-//BEA Systems Inc//DTD JMSML
Version 1.0
JMSML//EN" "jmsml.dtd">
    <jmsml>
        <operation Class="message" Type="Text" Name=
        "MyQueueSender"
            Factory="QueueConnectionFactory"
            Queue="exampleQueue"
            Body="Hello World">
        Send
        </operation>
    </jmsml>
```

In this instance, JMSML will create QueueSender with a non-transacted and auto-acknowledge JMSSession. Once this operation is executed, then the "MyQueueSender" object is still available for re-use later until the end of the program execution. That is, "MyQueueSender" can be re-used to send a different message(s) to a different queue.

System Architecture

In accordance with one embodiment, JMSML is implemented as a number of neatly abstracted JAVA components grouped together as the extensible JMSML engine., which utilizes technologies like JMS, JMX and XML to deliver the power that a JMS application developer needs, while hiding all the finer details of JAVA and JMS API behind a few XML tags.

FIG. 1 shows a logical diagram of a system in accordance with an embodiment of the invention, and depicts the steps used by the JMSML engine when processing a XML-formatted file containing JMSML-compliant tags. In practice the JMSML engine may run as a process on a computer server or other processing device. The other components of the system shown in FIG. 1 may operate or exist on the same device or on different devices. Some components may operate within the engine itself or may operate as different processes communicating with the engine. In one embodiment the engine includes the logical components or functionality of an XML parser 22, command processor 24, command dispatcher 26, message processor 28, mbean processor 30, system processor 32, logger 34, and result processor 42. Depending on the implementation not all of these components may be needed. The input JMSML (XML) program is validated and parsed into individual command objects that are dispatched to the appropriate command processors. Message processor executes all the JMS operations, MBean Processor executes all the JMX operations, and System Processor executes all the miscellaneous system commands, like SLEEP. The result of the execution is saved in an output file. As shown in FIG. 1, the file 20 is initially passed to an XML parser 22 which strips out the JMSML-formatted commands and sends them on to the command processor 24. The command processor 24 validates the snippets of code identified as JMSML commands, parses these bits of code into individual command objects, passes the resultant command objects to the command dispatcher 26, and sends a record of the transaction to the logger module 34. The command dispatcher will proceed to group the command objects into one of three categories: JMS command objects; JMX command objects; and system command objects. JMS command objects are passed to the Message processor module 28, JMX command objects are passed to the MBean processor module 30, and system command objects are passed to the System processor module 32. Each of these three modules 28, 30, 32 performs the requested operation and relays a record of the transaction to the logger module 34. The logger module 34 further propagates the execution record into a complete ".out" log file written from standard out 38, a ".verbose" log file suitable for debugging purposes 36, and a ".bmk" file suitable for benchmarking purposes 40. Finally, the result processor module 42 accepts data from both the ".bmk" benchmark file 40 and the standard output (".out") exhaustive log file 38, interprets this data according to the particular implementation, and returns a transmission to the JMSML user indicating the success or failure of the operation.

Figure 2:
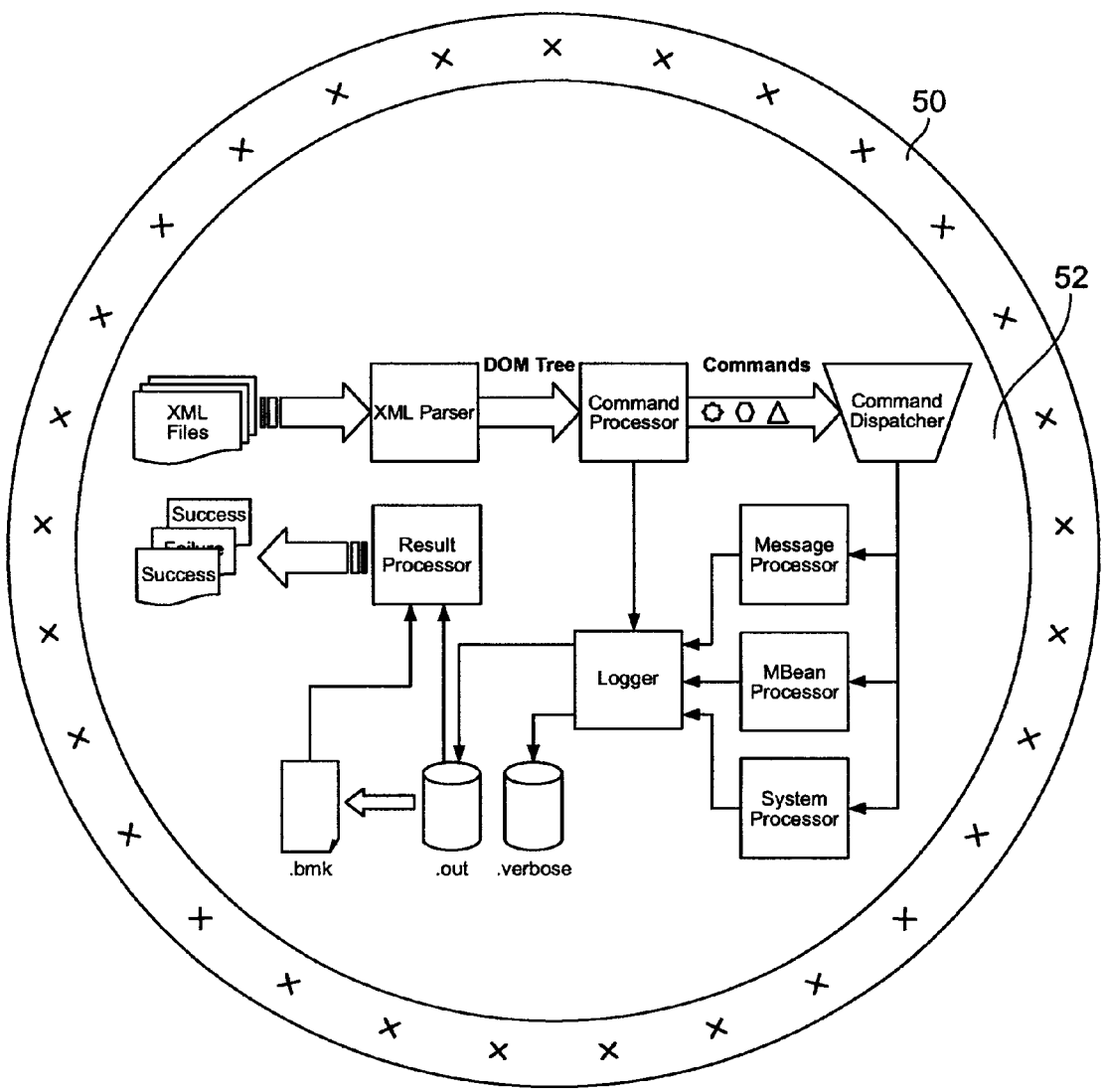
FIG. 2 shows a diagram of a JMSML engine as accessible through a plurality of "application wrappers" which facilitate user interaction with the engine, in accordance with an embodiment of the invention.

FIG. 2 illustrates that this method might also be imbedded within an "application shell" 50 which facilitates user interaction with the JMSML engine 52.

A few of the XML elements currently understood in the JMSML include those shown below. It will be evident that additional JMSML elements can be used and understood by the engine, depending on the particular implementation:

```
<jmsml></jmsml>
<scenario></scenario>
<operation></operation>
<repeat></repeat>
```

A typical structure of a JMSML program is shown below. It will be evident that each JMSML program need not adhere exactly to this structure:

```
<jmsml>
<operation></operation>
<repeat>
<operation></operation>
</repeat>
<scenario>
<purpose></purpose>
<expectedresult></expectedresult>
<operation></operation>
<operation></operation>
<repeat>
<operation></operation>
</repeat>
</scenario>
</jmsml>
<jmsml></jmsml>
```

<Operation></Operation>

The root element of the JMSML program is the <operation></operation> element. This element enables you to define any of the supported JMSML operations. Currently there are four categories of operations supported by JMSML, which provide for (1) JMS operations; (2) JMX operations; (3) WebLogic Server (or other server-specific) operations; and (4) SYSTEM operations. Table 1 shown below summarizes these operations. It will be evident that additional JMSML operations can be used depending on the particular implementation.

TABLE 1

| Operation Category | Name | Description | Object Type |
|---|---|---|---|
| JMS | Send | Send message to a Queue | JMS Message |
| | Receive | Receive message from a Queue | JMS Message |
| | Publish | Publish a message to a Topic | JMS Message |
| | Subscribe | Subscribe to message on a Topic | JMS Message |
| | Unsubscribe | Unsubscribe an existing Topic subscription | Subscriber |
| | Recover | Recover a JMSSession used by a given consumer | JMS Session |
| | Browse | Browse a Queue for messages | JMS Queue |
| | Drain | Empty a given JMSServer or a Destination | JMSServer JMSDestination |
| | Remove | Delete existing producers and consumers | SenderPublisher ReceiverSubscriber ((a)sync) |
| JMX | Add | Create a JMS configuration MBean with the given attribute values and add it to the server | JMS Mbean |
| | Change | Change the given attributes of an existing JMS Configuration Mbean | JMS Mbean |
| | List | List all the attributes and their values of a given JMS Configuration/Runtime MBean | JMS Mbean |
| | Remove | Delete an existing JMS Configuration MBean | JMS Mbean |
| | Verify | Verify a Configuration attribute or Runtime Attribute value against the given logical expression | JMS Mbean (Configuration and Runtime) |
| | Pause | Pause a running JMS destination (this is NOOP, if called more than once) | JMSDestination Runtime MBean |
| | Resume | Resume a paused JMS destination (this is NOOP, if called more than once or on a non-paused JMS destination) | JMSDestination Runtime MBean |
| | Start | Deploy (Target) a JMSServer MBean to WebLogic Server | JMSServer Runtime MBean |
| | Stop | Undeploy (Untarget) a JMSServer from a WebLogic Server | JMSServer Runtime MBean |
| WebLogic Server | Migrate | Migrate the JMS/JTA services from one instance of a WebLogic Server to another instance in a cluster | WebLogic Server Mbean |
| | Startup | Start (boot) a WebLogic Server instance through the Admin server using NodeManager | WebLogic Server Mbean |
| | Shutdown | Shutdown, a WebLogic Server instance through the Admin server using NodeManager | WebLogic Server Mbean |
| | Add | Create WebLogic Log Notification Filters and Listeners to receive WebLogic Server/Domain Log notifications for any given Subsystems | WebLogic Log Notification FilterWebLogic Log Notification Listener |
| | Remove | Delete the existing Log Notification Filters and Listeners | WebLogic Log Notification FilterWebLogic Log Notification Listener |
| JMSML SYSTEM | Sleep | Makes the JMSML engine sleep for the specified amount time during the execution process | JMSML engine |
| | Echo | Prints out the user specified string to the output file with Timestamp | JMSML engine |

Each of the operation elements include three required attributes that identify the operation Class, Type and Name of the object involved in the operation, as described in Table 2 below:

TABLE 2

| Attribute Name | Type | Required | Valid Values | Default |
|---|---|---|---|---|
| Class | String | Yes | "message"|"mbean"|"system" | |
| Type | String | Yes | Valid JMS/JMX objects | |
| Name | String | Yes | Java String | |

<Scenario></Scenario>

The <scenario></scenario> element is used to define a scenario by grouping multiple JMSML operations. This element only has three attributes, as listed in Table 3 below:

TABLE 3

| Attribute Name | Type | Required | Valid values | Default |
|---|---|---|---|---|
| Name | String | No | Java String | "" |
| Verify | Boolean | Yes | "true"|"false" | "false" |
| SortedVerification | Boolean | No | "true"|"false" | "false" |
| Persistence | Boolean | No | "true"|"false" | "false" |

The following example shows a JMS client scenario definition using JMSML:

<scenario Name="order_submission_test_1"
Verify="false"
Persistence="true">

<Purpose></Purpose>

The <purpose></purpose> element is a Text element that is used to define a purpose for a scenario. It has no attributes.

<Expectedresult></Expectedresult>

The <expectedresult></expectedresult> element is a Text element that is used to define the expected result of a scenario. It has no attributes.

<Repeat></Repeat>

The <repeat></repeat> element is an element which defines a repeat count for any given JMLS operation and/or scenario. It has only one attribute named "Count", which takes an integer value for the number of iterations.

JMSML Features

Figure 3:
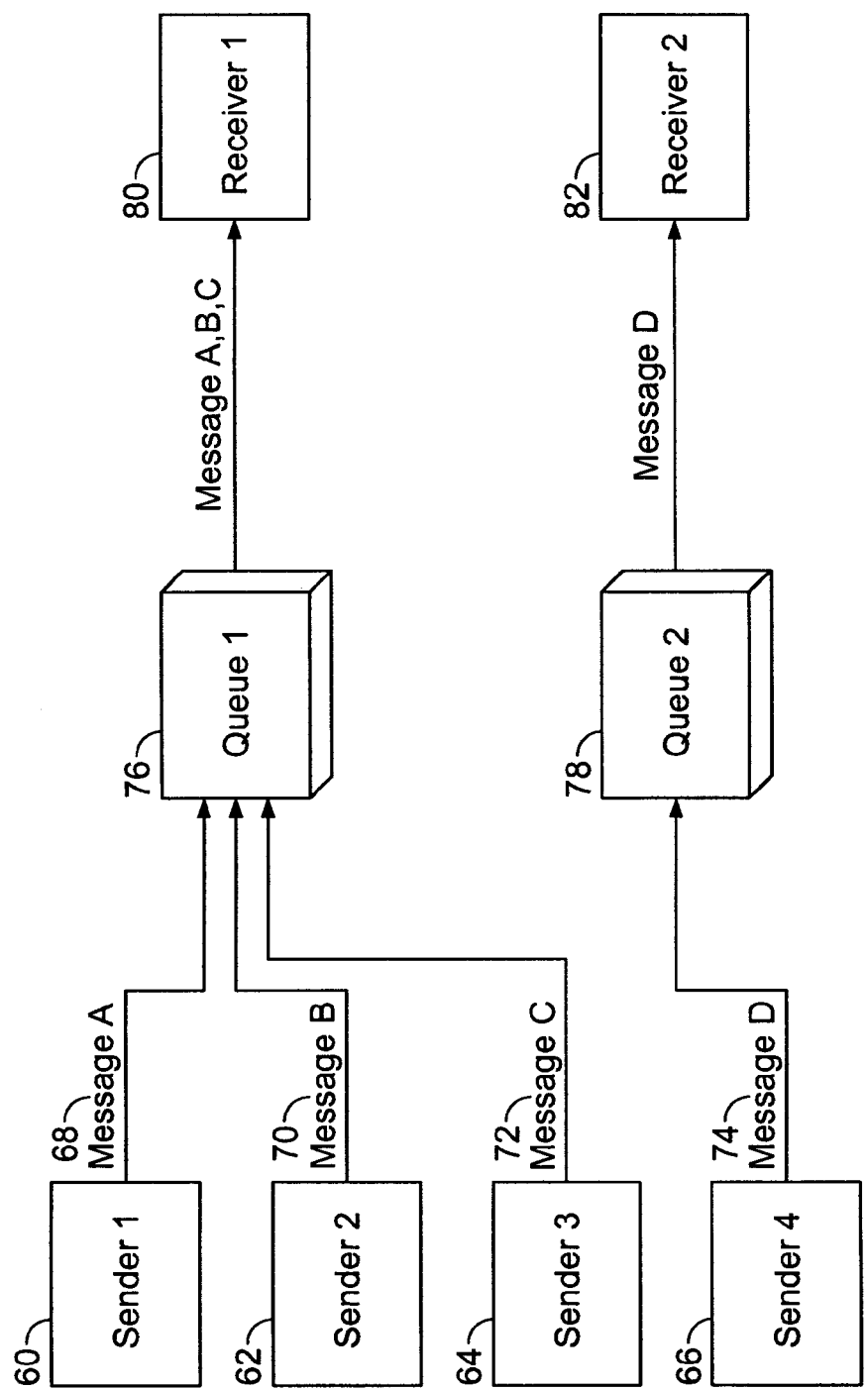
FIG. 3 depicts the interaction between senders, messages, queues and receivers in the Point-to-Point messaging model in accordance with an embodiment of the invention.
Figure 4:
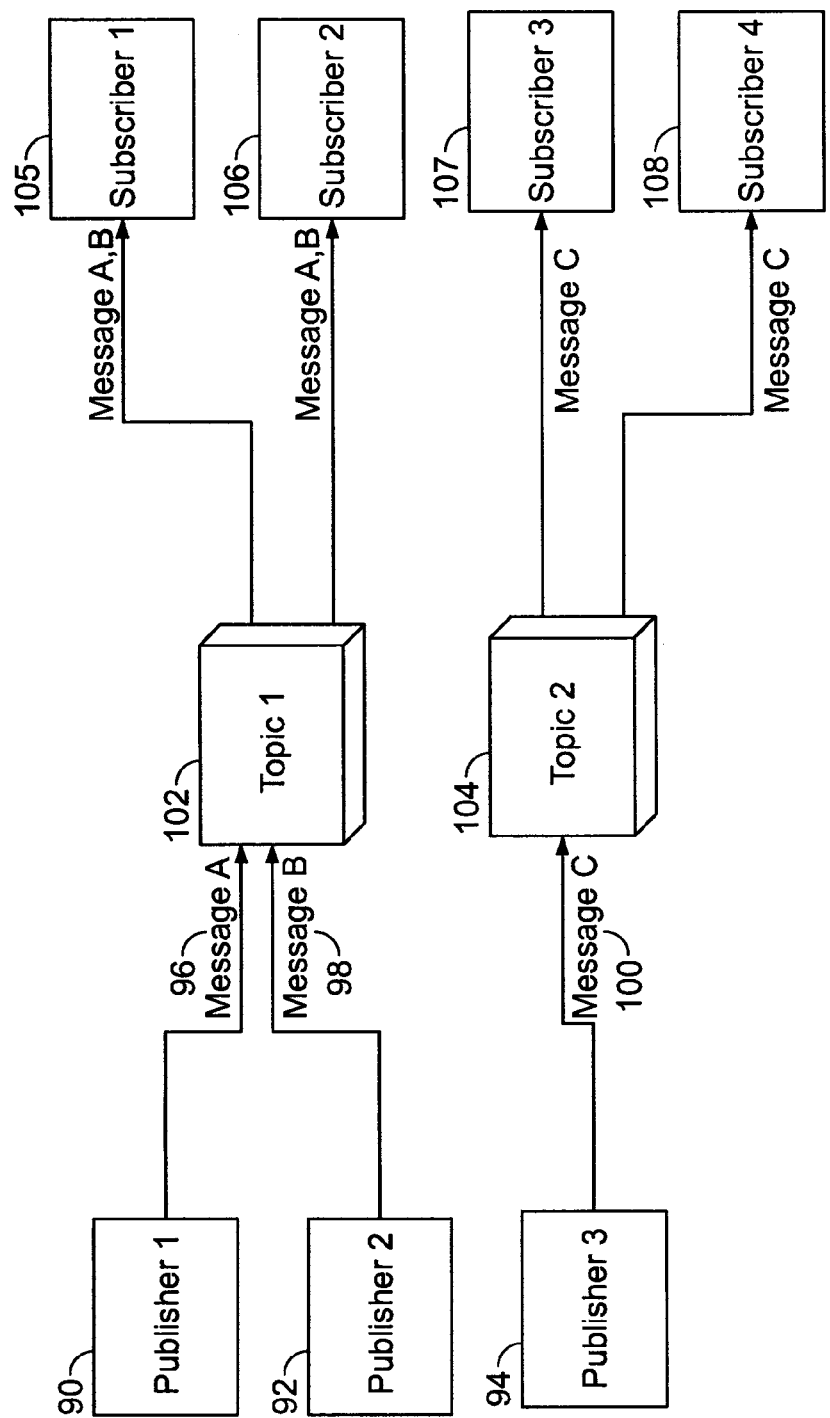
FIG. 4 depicts the interaction between publishers, messages, topics and subscribers in the Publish-Subscribe messaging model in accordance with an embodiment of the invention.

JMSML supports both "Point-to-Point" and "Publish-Subscribe" models, shown in FIG. 3 and FIG. 4 respectively. The Point-to-Point way of messaging is a communication paradigm where a one-to-one relationship exists between the message producers and the message consumers. This is achieved in JMS by using Queue destinations, as illustrated in FIG. 3. The Publish-Subscribe way of messaging is a communication paradigm where a one-to-many relationship exists between the message producers and the message consumers. This is achieved in JMS by using Topic destinations, as illustrated in FIG. 4. In addition to the JMS messaging operations, JMSML also provides for other useful operations, such as JMS Session recovery, JMS Queue Browsing, and Emptying a JMSServer or a JMS Destination. JMSML also includes support for the different Quality of Service (QOS) provided by, for example, the WebLogic JMS implementation for messaging, such as Transactions (both JTA and Transacted JMS Session), Persistence, acknowledgment, etc.

JMS Operations

Each of the JMS operations need only two required attributes to perform both "Point-to-Point" and "Publish-Subscribe": the JNDI names of the factory, and the queue (or topic). At the same time, all of the possible JMS API parameters are also available to the user and are mapped as operation element attributes. These attributes can be specified as a plain string, name-value pair. The JMSML processors will internally convert these values into appropriate JAVA data types required by the JMS API. Table 4 lists the operations defined for JMS:

TABLE 4

| Operation | Function |
| --- | --- |
| Send | Sends message to a queue |
| Receive | Receives message from a queue |
| Publish | Publishes a message to a topic |
| Subscribe | Subscribes a topic |
| Unsubscribe | Unsubscribe a topic |
| Recover | Recovers a given sender's JMSSession |
| Browse | Browses messages in a queue |
| Drain | Drains all the messages from a JMSServer or a destination |
| Remove | Removes the JMS objects |

Point-to-Point (PTP) Messaging Using JMSML

The following operations illustrate how JMSML can be used to send messages using a point-to-point (PTP) paradigm, in accordance with one embodiment of the invention. It will be evident that the invention is not limited to the operations and examples described below, which are presented to illustrate the functionality, features, and operation of JMSML.

Send

A "Send" operation is used to create a PTP message producer (or queue senders) and then use the newly created message producer to send messages to a queue destination indicated by queues 76, 78. Message receivers, also known as message consumers receive messages from queue destinations. As shown in FIG. 3, any single message 68, 70, 72, 74 may not be sent by more than one queue sender 60, 62, 64, 66, nor may it be received by more than one consumer 80, 82. If the operation is successful, then no message is logged to the output unless the "verbose" option is turned on. If the operation was not successful, then appropriate error messages will be logged as output. In one example, a JMS message producer named "QueueSender" can be created to send a JMS text message containing the string "Some Text" to the queue destination which is identified by the "Queue" attribute, using the JMS connection factory identified by the "Factory" attribute. The following example illustrates the syntax of a simple JMSML queue send operation with minimal attributes:

```
<operation Class="message" Type="Text"
    Name="QueueSender"
    Factory="JNDI Name of the ConnectionFactory"
    Queue="JNDI Name of the Queue Destination"
    Body="Some Text"
>Send</operation>
```

In the example shown below, the operation creates a sender object that generates and sends ten (10) text messages, each with "Hello World" as its content, to the queue "MyQueue". The operation uses the connection factory "MyConnectionFactory" within a JMS transacted, auto-acknowledged session, and commits the transaction. This send operation may be performed with QoS.

```
<operation Class="message" Type="Text"
    Name="MySender"
        Factory="MyConnectionFactory"
        Queue="MyQueue"
        TransactionType="JMS"
        Transaction="commit"
        Count="10"
        Body="Hello World"
>Send</ operation>
```

In the example below, the operation creates a sender and then tries to send eleven (11) text messages, each with "Hello World" as its content, to the queue "MyQueue" using the connection factory "MyConnectionFactory" within a JMS transacted, auto-acknowledged session, commits the transaction, and expects the "ResourceAllocationException" exception when the message quota on the destination "MyQueue" is set to "10". These messages may be sent with the ability to handle exceptions.

```
<operation Class="message" Type="Text"
    Name="MySender"
    Factory="MyConnectionFactory"
    Queue="MyQueue"
    ExpectedException="ResourceAllocationException"
    TransactionType="JMS"
    Transaction="commit"
```

-continued

```
        Count="11" Size="128"
    >Send</operation>
```

Receive

The "Receive" operation is used to create PTP message consumers (or queue receivers) that receive messages from a queue destination. If the operation is successful, then the content of the message will be logged as output, in addition to any explicit "Print" attribute values that are mentioned. If the operation was not successful, then appropriate messages will be logged as output.

In the example shown below, an Asynchronous (non-blocking) JMS message consumer named "QueueReceiver" is created to receive JMS text messages from the queue destination, which is identified by the "Queue" attribute using the JMS connection factory identified by the "Factory" attribute, and explicitly setting the "Mode" attribute to create an asynchronous queue receiver. This simple queue receive operation may be performed as follows:

```
    <operation Class="message" Type="Text"
        Name="QueueReceiver"
        Mode="Asynchronous"
        Factory="JNDI Name of the ConnectionFactory"
        Queue="JNDI Name of the Queue Destination"
    >Receive</operation>
```

In another example below, a synchronous (blocking) queue receiver receives ten (10) text messages from queue "Q1" using the connection factory "QCF1" within a user (JTA) transaction for the matching correlation ID selector, with an auto-acknowledged session, and rolls back the transaction. The operation blocks for 1 second between each message receive and prints the JMS properties message ID and priority as part of the output. A message receive operation within a JTA transaction, using a selector, may be performed as follows:

```
    <operation Class="message" Type="Text"
        Name="MyReceiver"
            Factory="jms.qa.connection.QCF1"
            Queue="jms.qa.destination.Q1"
        TransactionType="User"
        Transaction="rollback"
        Count="10"
        Wait="1"
        Selector="JMSCorrelationID like 'hello'"
        Print="JMSMessageID"
        Print="JMSPriority"
    >Receive</operation>
```

Publish-Subscribe (PubSub) Messaging Using JMSML

The following operations illustrate how JMSML can be used to send messages using a Publish-Subscribe (PubSub) paradigm, in accordance with one embodiment of the invention. It will be evident that the invention is not limited to the operations and examples described below, which are presented to illustrate the functionality, features, and operation of JMSML.

Publish

The "Publish" operation is used to create "Publish-Subscribe" message producers (or topic publishers) to publish messages to a topic destination. As illustrated in FIG. 4, the "Publish-Subscribe" messaging model differs slightly from the "Point-to-Point" messaging model in that, after being issued by a publisher 90, 92, 94, a single message 96, 98, 100 may be retrieved from an intermediate JMS Object data structure 102, 104 (referred to as a topic in this model), by any number of message consumers 105, 106, 107, 108, referred to as subscribers.

The following example shows a simple topic publish operation in accordance with one embodiment of the invention:

```
    <operation Class="message" Type="Text"
        Name="TopicPublisher"
        Factory="JNDI Name of the ConnectionFactory"
        Topic="JNDI Name of the Topic Destination"
        Body="Some Text"
    >Publish</operation>
```

In this example, a JMS text message containing the string "Some Text" is published to a topic destination that is identified by the "Topic" attribute, using the JMS connection factory identified by the "Factory" attribute. It should be noted that in the above examples for the send and publish operations, the "Body" attribute is used to specify the content of the JMS Text message that is sent. In cases where the body of the message is not important, this attribute may be ignored since it is not a required attribute of the operation element. In one embodiment, the default value for the message body of a JMS text message is a JAVA string of 1024 bytes in size containing the letter "a".

A topic may be published within a JMS transaction using a transacted session, as shown in the following example:

```
    <operation Class="message" Type="Text"
        Name="MyPublisher"
        Factory="jms.qa.connection.TCF1"
        Topic="jms.qa.destination.T1"
        TransactionType="JMS"
        Transaction="commit"
        Count="10"
        Size="128"
    >Publish</operation>
```

The above operation publishes ten (10) text messages of 128 bytes each (in this instance each with the default text "a" since no other body text is specified) to the topic "T1" using the connection factory "TCF1" within a JMS transacted, auto-acknowledged session, and commits the transaction.

Subscribe

The "Subscribe" operation is used to create "Publish/Subscribe" message consumers (or topic subscribers, including durable subscriptions) to receive messages from a topic destination. An example of how a simple durable subscription with very minimal attributes may be constructed in JMSML can be shown as follows:

```
    <operation Class="message" Type="Text"
        Name="TopicSubscriber"
        Factory="JNDI Name of the ConnectionFactory"
        Topic="JNDI Name of the Topic Destination"
```

-continued

```
            Durable="Durable Subscription Name"
        >Subscribe</operation>
```

In the above example, a Topic subscriber named "TopicSubscriber" is created for the durable subscription (identified by the "Durable" attribute) to receive JMS text messages from the topic destination, which in turn is identified by the "Topic" attribute, using the JMS connection factory identified by the "Factory" attribute.

Unsubscribe

The "Unsubscribe operation is used to unsubscribe any previously created subscription by a given topic subscriber. An example of an unsubscribe operation in accordance with one embodiment of the invention is shown below.

```
<operation Class="message" Type="Text"
        Name="TopicSubscriber"
    >UnSubscribe</operation>
```

In this example, the current subscription by the "TopicSubscriber" is unsubscribed.

Miscellaneous JMS Operations Using JMSML

The following operations illustrate how JMSML can be used to perform miscellaneous JMS operations, in accordance with one embodiment of the invention.

Recover

The "Recover" operation may be used to recover the JMSSession that is currently used by the consumers. The process of recovering a JMSSession used by a queue sender can be accomplished with the following XML code example:

```
<operation Class="message" Type="Text"
        Name="QueueSender"
    >Recover</operation>
```

A JMSSession used by a queue receiver may be recovered similarly, as shown in the example below.

```
<operation Class="message" Type="Text"
        Name="QueueReceiver"
    >Recover</operation>
```

In the examples shown above, the current session used by "QueueSender" and "QueueReceiver" are recovered respectively.

Browse

The "Browse" operation is used to browse the messages that are currently available in a queue destination. The following XML code example creates a simple queue browser in accordance with one embodiment of the invention:

```
<operation Class="message" Type="Text"
        Name="MyBrowser"
```

-continued

```
            Factory="MyFactory"
            Queue="MyQueue"
        >Browse</operation>
```

In the above example, a browser named "MyBrowser" is created to peek into the messages residing in the "MyQueue" destination.

Drain

The "Drain" operation is used to empty the messages from a given JMS server or JMS destination. In accordance with one embodiment of the invention, a drain may be accomplished using the following XML code examples (which describe draining a JMS server, and a JMS destination, respectively):

```
Draining a JMS Server
    <operation Class="message" Type="Text"
            Name="MyDrainer1"
            JMSServer="MyJMSServer"
        >Drain</operation>
Draining a JMS Destination
    <operation Class="message" Type="Text"
            Name="MyDrainer2"
            JMSServer="ErrorQueue"
        >Drain</operation>
```

Remove

JMSML processors create and maintain several types of JMS objects including "Senders", "Publishers", "SyncQueueReceivers", "AsyncQueueReceivers", "SyncTopicSubscribers", "AsyncTopicSubscribers", and "Browsers" in the corresponding object pools. In accordance with one embodiment of the invention, when these objects are no longer needed, they can be removed from the pool by using the "Remove" operation. The "Remove" operation is used to remove the JMS producers and consumers that are identified in the "Type" attribute from the JMSML producer and consumer pools.

The following XML code examples illustrate how a queue sender and a synchronous queue receiver, respectively, may be removed from the JMSML producer and consumer pool, in accordance with one embodiment of the invention:

```
Removing a Queue Sender from the JMSML Producer Pool
    <operation Class="message" Type="Sender"
            Name="Sender"
        >Remove</operation>
Removing a Synchronous Queue Receiver
    <operation Class="message" Type="SyncQueueReceiver"
            Name="SyncQueueReceiver"
        >Remove</operation>
```

JMX Operations

Each JMX operation depends mainly on two required "Type" and "Name" attributes of the operation element. The "Class" attribute is set to MBean for all the JMX operations. All other MBean attributes are specified as plain string name-value pair depending on the JMX operation. JMSML processors internally convert these values into appropriate JAVA data types required by the JMX API. Depending on the JMX operation, JMSML also provides default attribute values for the MBean operations.

Table 5 lists the JMSML operations defined for JMX, and which are explained with examples in the sections below.

TABLE 5

| | |
|---|---|
| Add | creates a JMS Config MBean |
| Change | changes the attributes values of a JMS MBean |
| List | lists the attribute values of a JMS Config/Runtime MBean |
| Remove | deletes a JMS Config MBean |
| Pause | pauses a JMS Runtime Destination |
| Resume | resumes a paused JMS Runtime Destination |
| Start | deploys (Target) a JMSServer to WebLogic Server |
| Stop | undeploys (Untarget) a JMSServer from WebLogic Server |
| Migrate | migrates the JMS Service between WebLogic Servers |
| Startup | starts up a WebLogic Server instance |
| Shutdown | shuts down a WebLogic Server instance |

Add

This operation is used to create a new JMS "Config MBean" which is identified by the "Type" with the given attribute values, and will be named using the "Name" attribute value. The example below illustrates how a JMSServer with default attribute values may be created, in accordance with one embodiment of the present invention.

```
<operation Class="mbean" Type="JMSServer"
    Name="MyJMServer1"
    Targets="MyWebLogicServer"
>Add</operation>
```

The above operation creates a JMSServer MBean with all the default attribute values, and targets it onto the MyWebLogicServer instance.

One may also create a JMSServer MBean and simultaneously set the attribute values, as shown in the following example:

```
<operation Class="mbean" Type="JMSServer"
    Name="MyJMServer2"
    MessagesMaximum="10000"
    MessagesThresholdHigh="7500"
    MessagesThresholdLow="500"
    BytesMaximum="1024000"
    BytesThresholdHigh="7500"
    BytesThresholdLow="500"
    Targets="MyWebLogicServer"
>Add</operation>
```

The operation shown above creates a JMSServer MBean with given attribute values, and targets it onto the MyWebLogicServer instance.

In accordance with one embodiment of the invention it is also possible to create a JMSDestination MBean and simultaneously set the attribute values, as shown in the example below:

```
<operation Class="mbean" Type="Queue"
    Name="MyQueue"
    JMSServer="MyJMSServer1"
    JNDIName="MyQueue1"
    BytesMaximum="1024"
    BytesThresholdHigh="512"
    BytesThresholdLow="64"
    MessagesMaximum="16"
    MessagesThresholdHigh="8"
    MessagesThresholdLow="2"
```

-continued

```
    PriorityOverride="6"
    TimeToLiveOverride="7200000"
    DeliveryModeOverride="Persistent"
    StoreEnabled="default"
>Add</operation>
```

The above operation creates a queue destination "MyQueue1" with the specified attribute values, and adds it to the existing JMSServer "MyJMSServer1".

Change

The "Change" operation is used to change the attribute values of an existing JMS Config MBean. The following examples illustrate the change operations performed on a newly created JMS connection factory MBean in accordance with one embodiment of the invention:

```
<operation Class="mbean" Type="ConnectionFactory"
    Name="FCCF1"
    FlowControlEnabled="true"
    JNDIName="FCCF1"
    FlowMaximum="1000" FlowMinimum="100"
    FlowInterval="300" FlowSteps="30"
    Targets="myserver"
>Add</operation>
<operation Class="mbean" Type="ConnectionFactory"
    Name="FCCF1"
    FlowMaximum="100"
>Change</operation>
<operation Class="mbean" Type="ConnectionFactory"
    Name="FCCF1"
    FlowMaximum="99"
    ExpectedException="InvalidAttributeValueException"
>Change</operation>
```

It should be noted that the examples described above show how both "Add" and "Change" operations can be combined together to achieve specific dynamic management scenarios. The "ExpectedException" attribute is used in the second "Change" operation to illustrate the handling of negative scenarios by JMSML when used for configuration testing.

List

The "List" operation displays all of the attributes of all JMS "Config MBeans" and/or all "Runtime MBeans". Such a listing of "Config" and "Runtime MBean" attributes may, respectively, be generated by using a JMSML syntax similar to the following example:

```
<operation Class="mbean" Type="Config"
    Name="All"
>List</operation>
<operation Class="mbean" Type="Runtime"
    Name="All"
>List</operation>
```

At times, it may be desirable to list statistics for only one specific "Config" or "Runtime MBean". Such a listing may be obtained by setting the "Name" tag to the name of the desired MBean while performing the "List" operation. This may be performed using syntax similar to the following example:

```
<operation Class="mbean" Type="JMSServer"
    Name="MyJMSServer"
>List</operation>
```

The above operation will list all configuration attributes of the JMSServer MBean "MyJMSServer".

```
<operation Class="mbean" Type="DestinationRuntime"
    Name="MyQueue"
>List</operation>
```

The above operation lists all the statistics information, such as the current message count and pending messages count, of the "MyQueue" destination.

Remove

The "Remove" operation is used to remove the JMS "Config MBeans" identified in the "Type" and "Name" attributes from a server instance (for example a WebLogic Server instance). Remove may be performed as shown in the following example:

```
<operation Class="mbean" Type="JMSServer"
    Name="MyJMSServer"
>Remove</operation>
```

This operation removes the instance of the "MyJMSServer" JMSServer MBean.

Pause

The "Pause" operation is used to pause the JMSDestination Runtime MBean that is identified by the "Name" attribute and may be performed as shown in the example below:

```
<operation Class="mbean" Type="DestinationRuntime"
    Name="MyQueue"
>Pause</operation>
```

Resume

The "Resume" operation is used to resume a previously paused JMSDestination Runtime MBean, identified by the "Name" attribute. This operation may be performed as follows:

```
<operation Class="mbean" Type="DestinationRuntime"
    Name="MyQueue"
>Resume</operation>
```

Start

The "Start" operation is used to dynamically deploy (target) the JMSServer MBean to a given application server instance. This deployment may be accomplished shown in the following example.

```
<operation Class="mbean" Type="JMSServerRuntime"
    Name="BE1"
>Start</operation>
```

Stop

The "Stop" operation is used to dynamically undeploy (untarget) the JMSServer MBean from a given server (for example a WebLogic Server) instance. This operation may be performed as follows:

```
<operation Class="mbean" Type="JMSServerRuntime"
    Name="BE1"
>Stop</operation>
```

Migrate

The "Migrate" operation provides the capability for migration of a JMSService between multiple server (for example WebLogic Server) instances within a cluster for managed failover processing. For example, a JMSService may be migrated from the current source or "preferred" server to a destination server "S2" of the migratable target "MT12" using the following syntax:

```
<operation Class="mbean" Type="MigratableTarget"
    Name="MT12"
    TargetServer="Admin"
    DestinationServerName="S2"
    SourceServerUp="false"
>Migrate</operation>
```

Startup

The "Startup" operation is used to start a managed server (for example WebLogic Server) instance with the help of a running server manager or node manager ("NodeManager") on that machine. In order to execute this operation, the, "TargetServer" attribute must be specified with the value of the "Admin" server name. For example, a managed server instance "S1" could be started using the "NodeManager" running on the same machine using the following syntax:

```
<operation Class="mbean" Type="Server"
    Name="S1"
    TargetServer="Admin"
>Startup</operation>
```

Shutdown

The "Shutdown" operation is used to shut down a running managed server instance with the help of the "NodeManager" running on that machine. In order to execute this operation, the "TargetServer" attribute must be specified with the value of "Admin" server name. For example, a managed server instance "S1" can be shut down using the "NodeManager" running on the same machine using the following syntax:

```
<operation Class="mbean" Type="Server"
    Name="S1"
    >Shutdown</operation>
```

System Operations Provided by JMSML

System operations are support operations that work in conjunction with the JMS and JMX operations previously discussed. System operations are performed by first setting the Class and Type attributes of the operation to the value "System".

Sleep

In accordance with one embodiment, JMSML provides the capability for directing the system to pause, or sleep, for a preset amount of time. The user can specify the quantity of time desired and the unit of time measurement. For example, the "Sleep" operation can be performed by first setting the "Class" and "Type" attributes to the value "System", and setting the "Time" and "Unit" attributes to the desired number and unit of time measurement, respectively:

```
<operation Class="system" Type="System"
    Silent="true"
    Time="5" Unit="Seconds"
    >Sleep</operation>
```

In the example given above, the operation makes the JMSML engine sleep for 5 seconds. The "Silent" attribute indicates that no output message of any sort is created for the execution of this operation. If this attribute is set to "False", then there will be a message output indicating the execution of this "Sleep" operation.

Echo

The "Echo" operation directs the system to send a certain text string to "standard out". This command may be used in troubleshooting programs. The "Echo" operation may be used as shown in the following example:

```
<operation Class="system" Type="System" OutputEnabled="true"
    TimeStampEnabled="true"
    Body="Hello World with output enabled true">Echo</operation>
```

The above syntax would send the following string as output (depending on current system time):

```
16:51:19 ECHO Hello World with output enabled true
```

This particular functionality is valuable, particularly as applied to problems which arise when attempting to troubleshoot a system with a heavy transaction load. The "Echo" command provides the ability to isolate specific transmissions and allows for immediate location of certain events of interest in the system log files.

JMSML Execution Methods

The JMSML language can be supported in a variety of different environments and through a variety of different interfaces, which can be presently summarized as follows:
1. JMSML Integrated Development Environment (IDE);
2. Standalone Java Client; or,
3. JAVA Servlet webapp.

The method of parsing a text file so as to generate JMS and JMX commands and the organization of the various components which comprise the JMSML method previously described may be implemented in a variety of client and server environments. The JMSML user may choose to employ the JMSML functionality in whichever embodiment best suits his/her personal preferences or business objectives. The particular embodiments described hereafter are not intended to be exhaustive. Rather, these examples are given for illustrative purposes, and for the purpose of enabling one of ordinary skill in the art to perform the method described.

JMSML Markup Language as Part of an Integrated Development Environment (IDE)

Traditional JAVA development follows the steps of creating the source code, and then compiling and executing the code on a specific platform. The increasing complexity of function and integration of tools over multiple platforms means that tool development cannot generally be performed by small groups of developers. Often the only way to produce a fully functioning application is to make use of specially-designed application development tools in order to build other tools. Today's applications are built using a mix of low-level tools such as source editors and debuggers, along with high-level builders for creating user interface, data access, distribution support, and code generators. The applications which are built in such environments are targeted to run in a multiplicity of execution environments, on various hardware platforms, supporting many distribution mechanisms and data access mechanisms. Developing such applications usually requires the use of multiple different tools from multiple different vendors, each solving a piece of the overall puzzle.

Figure 5:
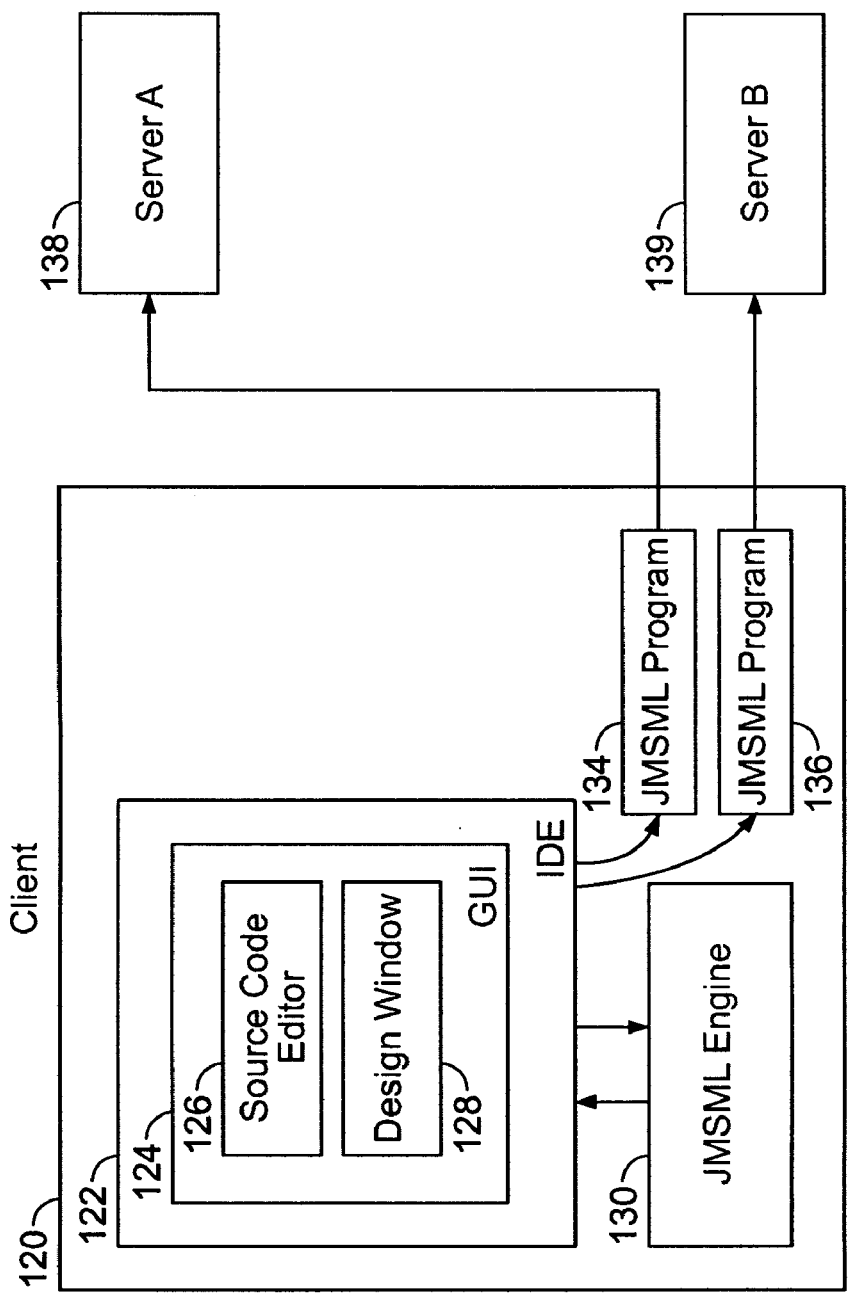
FIG. 5 shows a JMSML system that includes an Integrated Development Environment in accordance with an embodiment of the invention.
Figure 6:
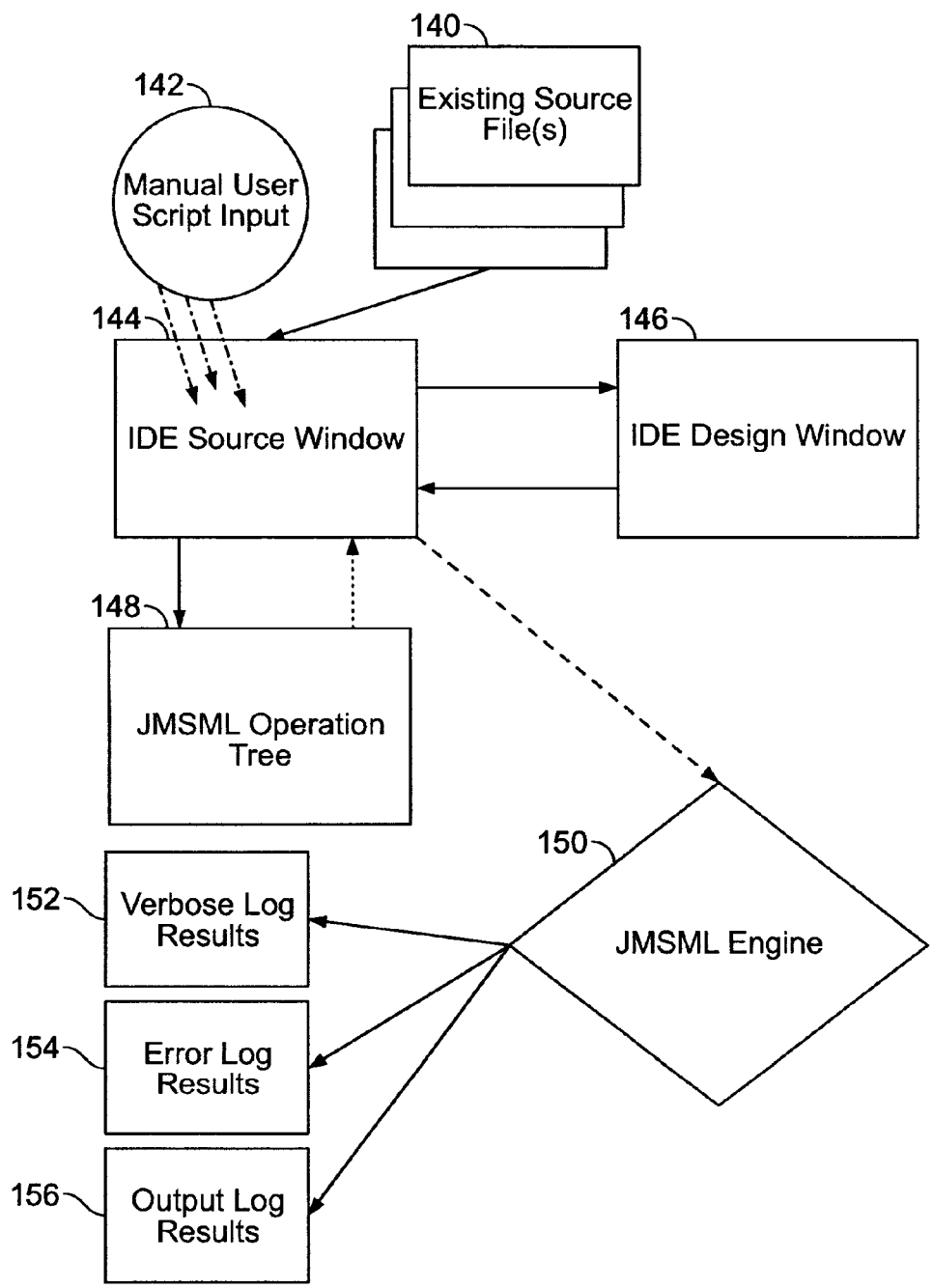
FIG. 6 shows the layout and components of an Integrated Development Environment may be configured in accordance with an embodiment of the invention.

The most efficient way for a developer to program is usually to operate within an integrated development environment (IDE), in which information provided by each tool during program development can be shared with other tools, particularly those being used in the same development effort, so as to avoid duplication, and inconsistencies in the interface and function operations. JMSML development may involve writing a XML file and then tweaking this file based on output received from other components of the JMSML engine. Therefore, in accordance with one embodiment of the invention, the components of the JMSML engine can be incorporated into an JMSML-tailored IDE, further extending the ease of performing JMS and JMX operations. FIG. 5 shows a JMSML system that includes an Integrated Development Environment in accordance with an embodiment of the invention. The IDE itself can be bundled as a JAR file and executed from any Java Virtual Machine (JVM). In the embodiment shown in FIG. 5, the client 120 includes an Integrated Development Environment (IDE) 122 that includes a Graphical User Interface (GUI) 124. Among other tools and features, the GUI may include a source code editor 126 that allows direct editing of the JMSML code, and a design window 128 that allows for visual-based program design. The IDE works with a JMSML engine 130 located at the client, to create, update, and execute JMSML programs 134, 136. The JMSML programs can perform operations on any of local or remote servers 138, 139. FIG. 6 shows the various components used by the IDE. As shown in FIG. 6, XML formatted JMSML commands may be introduced into the IDE Source Window 144 from a plurality of sources, such as from a preexisting source file 140, or they may alternatively be acquired from an input device, such as a keyboard when the IDE user manually inputs such commands 142. In some embodiments the system can additionally comprise a design window 146 to give a pictorial representation of the JMSML commands, and a JMSML operation tree 148 to give the IDE user a "birds-eye" view of the code as a whole. The commands shown in the source window 144 can then be passed to the JMSML engine 150, and after being processed, the results of these commands stored in a verbose log 152, an error log 154, or an output log 154. One example of such an IDE comprises a multi-sectioned graphical user interface as depicted in FIGS. 7-14. The key functional components of the IDE in this embodiment are the previously mentioned source window 206 and the design window 258. The IDE user may toggle between these windows by using the tabs 214, 216 situated on the bottom left corner of the window.

Figure 7:
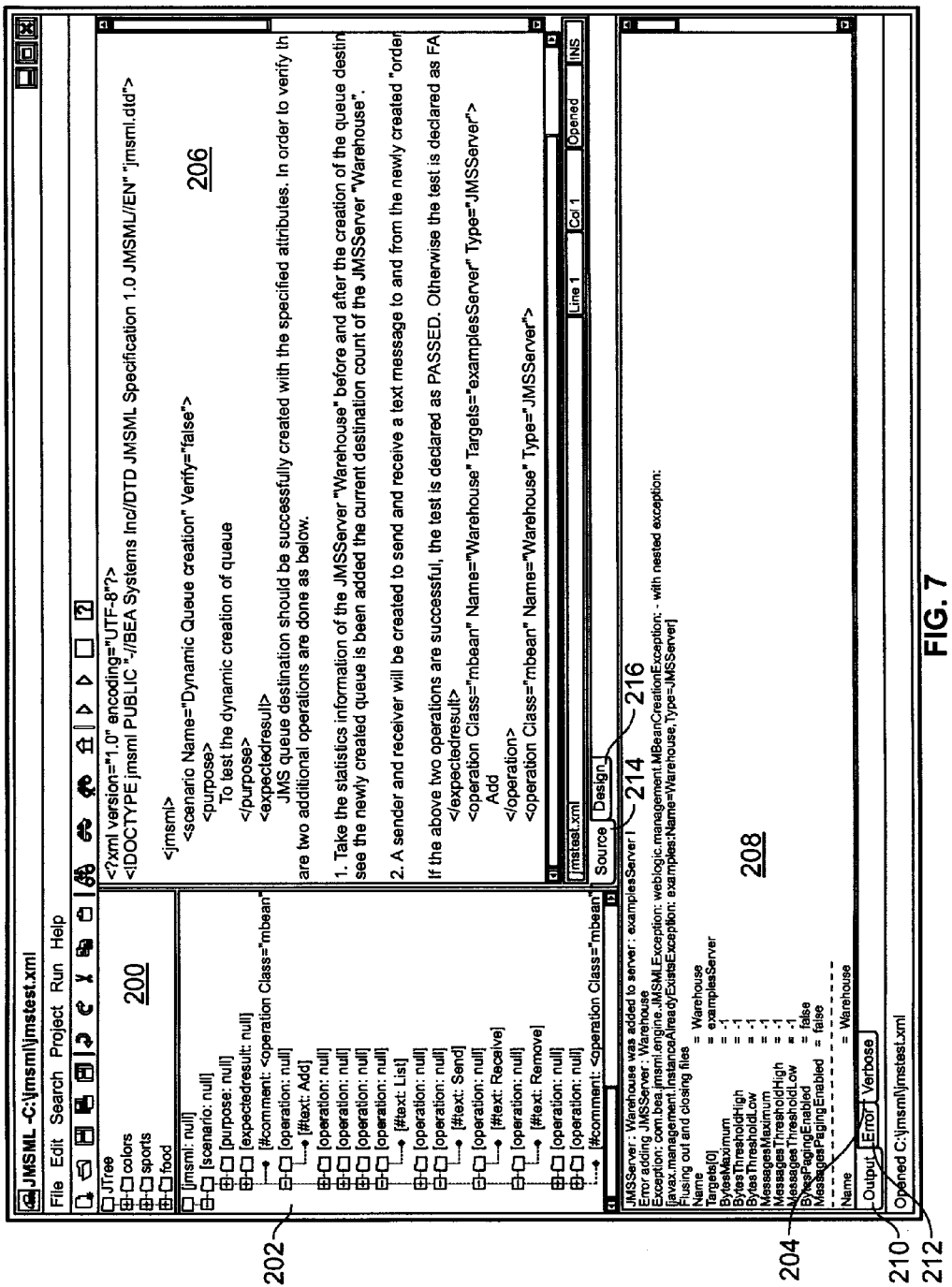
FIG. 7 is a screenshot depicting a high level overview of how the JMSML Integrated Development Environment may be configured in one embodiment of the invention.

As shown in FIG. 7, the source window 206 allows for manual code manipulation, and the JMSML operations may be loaded into this window from an existing XML file or entered by the user. As JMSML code is entered into the source window, the JMSML Operation Tree 202 located in the left hand side section of the IDE is populated after the JMSML engine has made a determination that a valid and properly formatted JMSML operation has been created in the source window 206. The JMSML Operation Tree allows a "birds-eye" view of the JMSML source code and also enables the IDE user to quickly jump to a certain section of code in the source window 206 by simply clicking on the desired JMSML entry in the tree 202. The JMSML Integrated Development Environment Project Management Tree 200 provides a project-level view of all compilations of JMSML code. For example, a user might have multiple XML source files which will ultimately be located on separate systems running the JMSML engine. The user may wish to copy a set of JMSML operations from one source file to the next. The JMSML Integrated Development Environment Project Management Tree 200 allows him/her to toggle between projects, copying from one and pasting into another and managing multiple JMSML files as a single project. Additional features include tabs to switch from a source view 214, to a design view 216; and a log output window 208 which includes tabs to switch from regular output 210, to error output 212, or verbose output 204.

Figure 8:
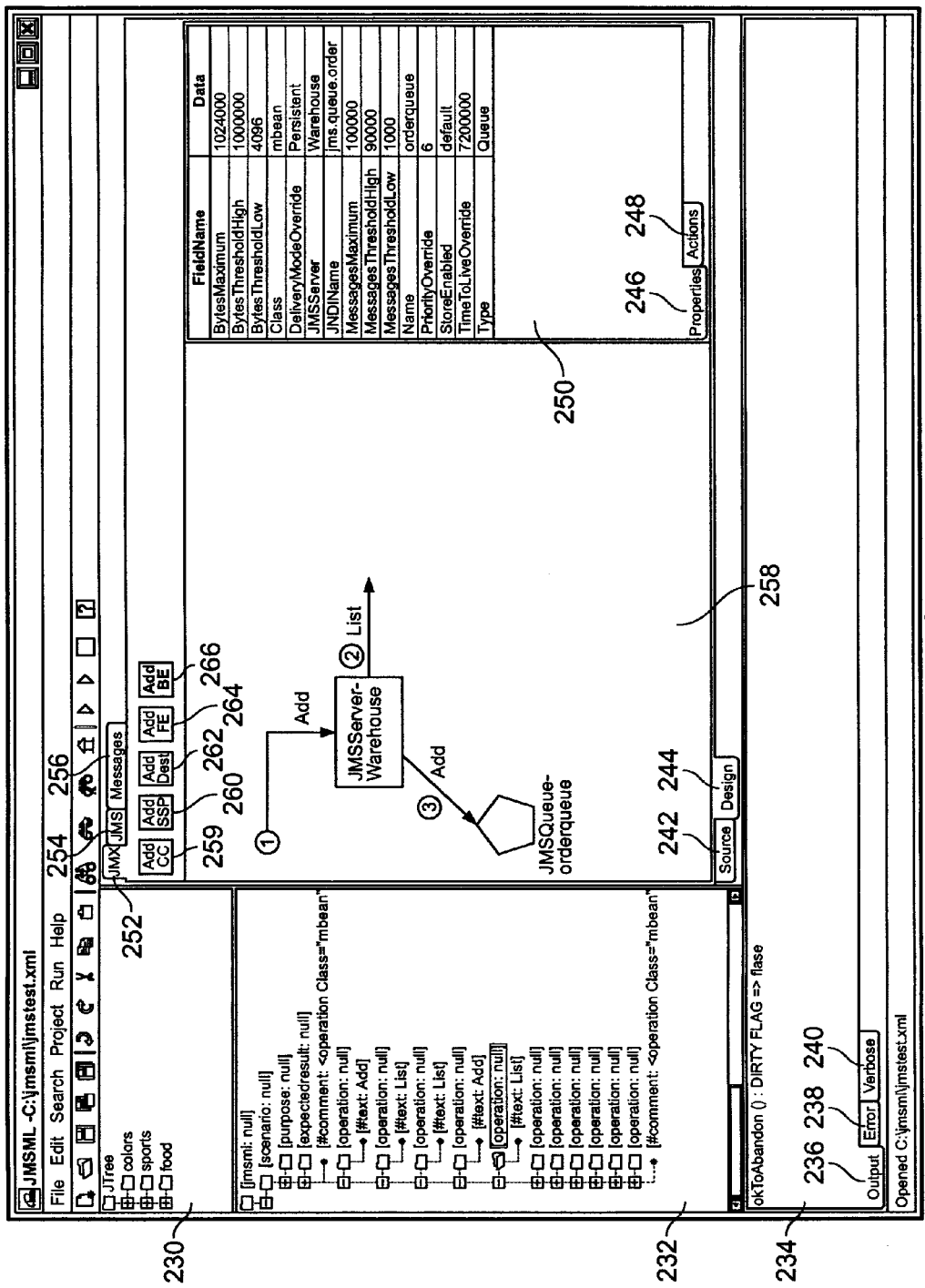
FIG. 8 is a screenshot of the JMSML Integrated Development Environment illustrating the JMX design screen feature in accordance with an embodiment of the invention.
Figure 9:
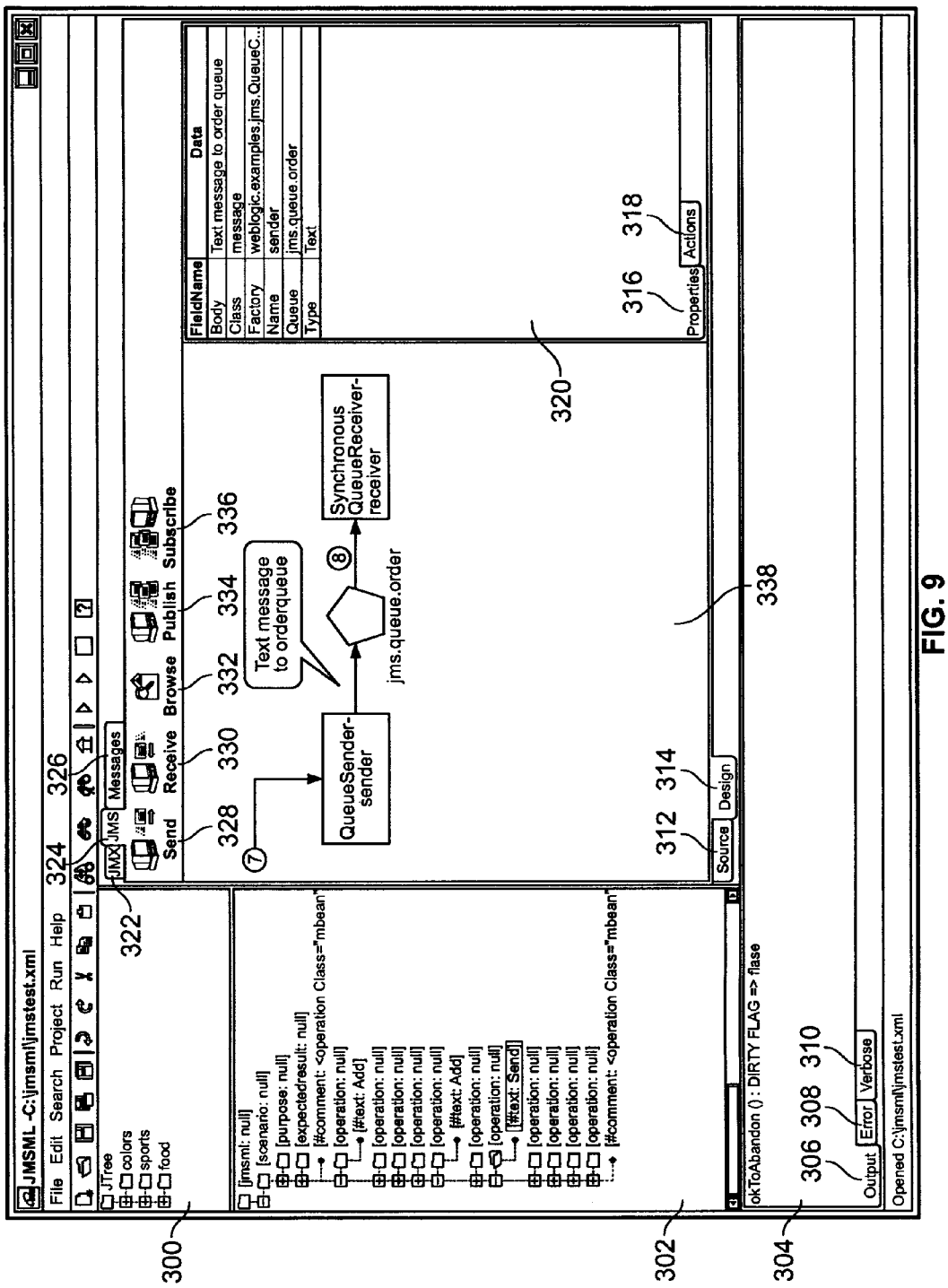
FIG. 9 is a screenshot of the JMSML Integrated Development Environment illustrating the JMS design screen feature in accordance with an embodiment of the invention.
Figure 10:
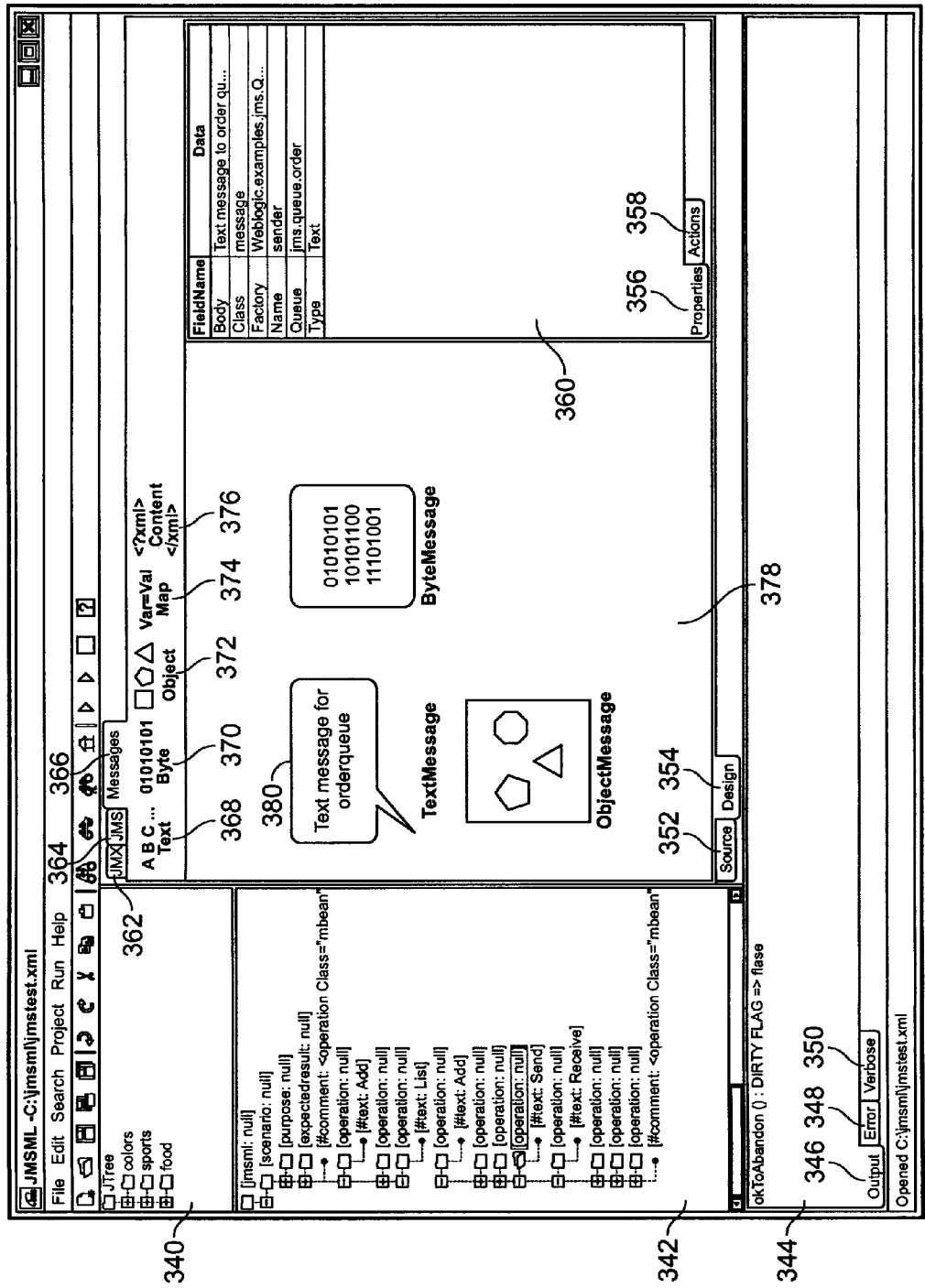
FIG. 10 is a screenshot of the JMSML Integrated Development Environment illustrating the Messages design screen feature in accordance with an embodiment of the invention.

FIGS. 8, 9 and 10 illustrate additional features within the design window component of the IDE. In one embodiment of the IDE, the design window 258 enables the IDE user to generate JMSML commands using a pictorial representation of the various elements and commands. Once the design window 258 is displayed, the IDE user will select either the JMS 252, JMX 254, or Messages 256 toolbars tab, depending on the operation being performed. Each of these tabs, once selected, triggers the engine to display a plurality of operations available for creation or execution. The IDE user can then complete additional steps to accomplish his/her desired operation, such as editing the properties of a JMS object shown in the properties window 250, or creating a new topic or destination. As these operations, are performed pictorially in the design window, the corresponding JMSML-compliant code is generated in the source window. After finishing with the design window, the IDE user can then toggle back to the source window and fine-tune the JMSML-compliant code which now appears in the source window.

As described above, each toolbar tab 252, 254, 256 in the design window 258 offers a plurality of functionalities designed to make creating JMS and JMX operations easier. If the IDE user selects the JMX tab 252, the five JMX options depicted in FIG. 8 will be displayed. The first JMX option labeled "Add CC" 259 allows the IDE user to create a JMS Connection Consumer.

Another JMX option, labeled "Add SSP" 260, allows the IDE user to create a Server Session Pool MBean which is of particular use for asynchronous JMS consumers. Another JMX option, labeled "Add Dest" 262, allows the user to create a queue or topic destination object.

Another JMX option labeled "Add FE" 264, allows the IDE user to create a JMSConnectionFactory (front-end) object. This object must be created before a session may be established or a message producer or consumer may be created. The user will typically selected a queue or topic via a JNDI lookup, and associate this queue or topic with the newly created JMSConnectionFactory (front-end) object.

Another JMX option labeled "Add BE" 266, allows the IDE user to create a JMSServer (back-end) object. JMSServer objects serve as containers for JMS destinations such as queues and topics. A JMSServer container must be created before the user attempts to create either type of destination object.

The IDE user may also select the JMS tab 254 and this action would trigger the IDE to display several JMS options, shown in FIG. 9.

One JMS option, labeled "Send" 328, will create a "Sender" type message producer using the specified JMSConnectionFactory object and then proceed to send a message to a certain queue destination object.

Another JMS option, labeled "Receive" 330, will create a "Receiver" type message consumer using the specified JMSConnectionFactory object and then proceed to retrieve a message from a certain queue destination object.

Another JMS option, labeled "Browse" 332, allows a user to view the contents of the queue destination object.

Another JMS option, labeled "Publish" 334, will create a "Publisher" type message producer using the specified JMSConnectionFactory object and then proceed to publish a message to a certain topic destination object.

Another JMS option, labeled "Subscribe" 336 will create a "Subscriber" type message consumer using the specified JMSConnectionFactory object and then proceed to retrieve a message from a certain topic destination object.

In accordance with some embodiments, the IDE user may wish to explicitly create a certain type of JMS message. FIG. 10 illustrates an interface in accordance with an embodiment of the invention that allows them to do so. The IDE user can click on the "messages" tab 366 which triggers the IDE to display the "messages" operations toolbar window 378. The user is then presented with 5 buttons which may be used to either create a text message 368, a byte message 370, an object message 372, a mapping message 374 or a content message 376. Once the user has clicked the appropriate button, he must then enter appropriate values in the property window 360. For example, in FIG. 9, the IDE shown therein shows that the user is in the process of creating a text message containing the string "Test message for order queue" as shown both in the property window 360 and the corresponding visualization of the new message 380 displayed in the messages operations window 378.

Figure 11:
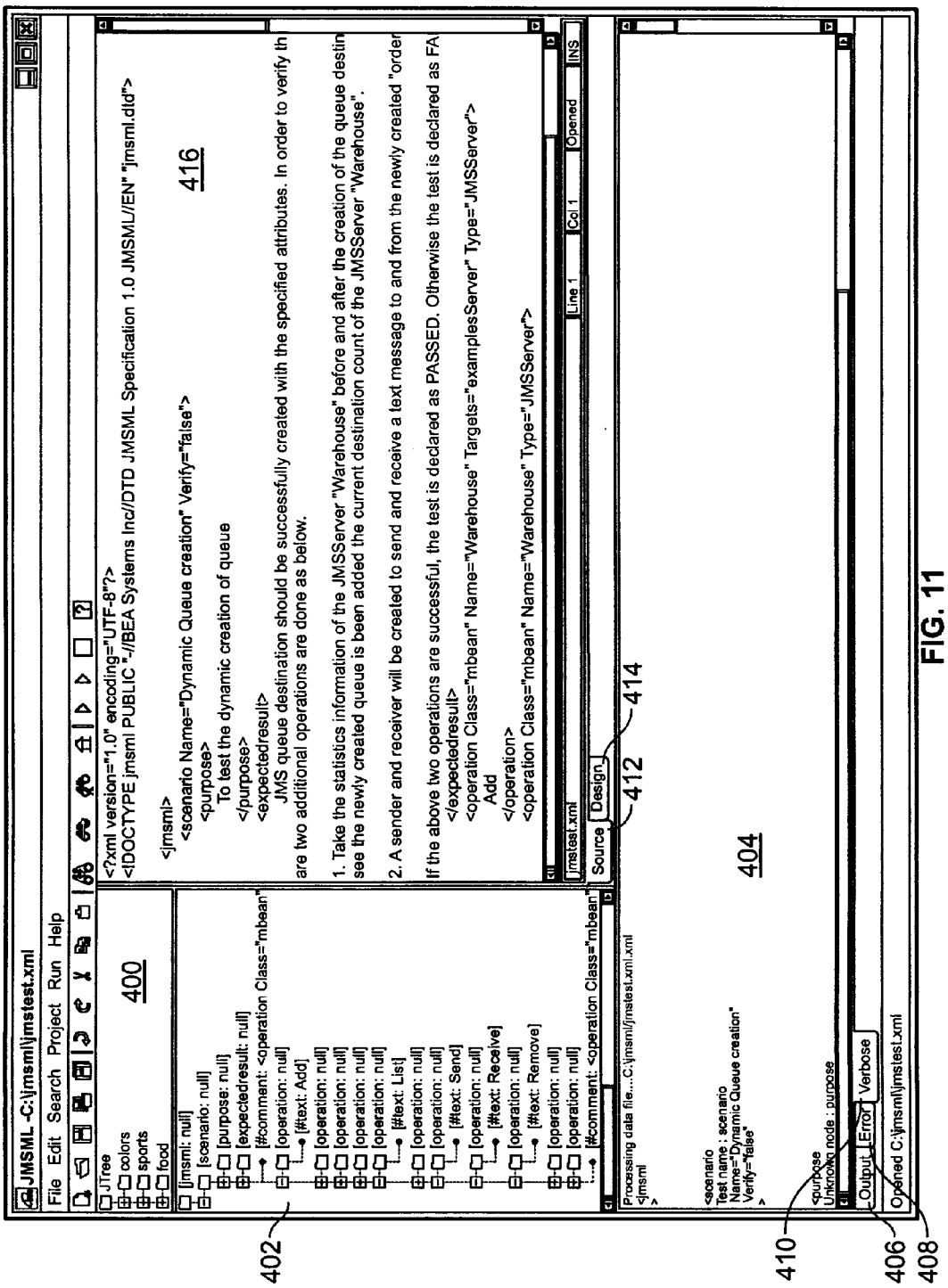
FIG. 11 is a screenshot of the JMSML Integrated Development Environment depicting leaves in the JMSML Operation Tree which have corresponding entries in the Integrated Development Environment Source Window, and also shows the type of output displayed in the Integrated Development Environment Verbose Window after the JMSML code residing in the Integrated Development Environment Source Window is executed.

FIG. 11 shows the IDE in accordance with another embodiment of the invention, wherein the user has directed that verbose logging be displayed during the execution of the JMSML source code shown in the source window 416. After the execution, the user can view the these verbose output in the IDE by clicking the "Verbose" tab 410. The "Verbose" option will typically be used in this embodiment of the invention when debugging code.

Figure 12:
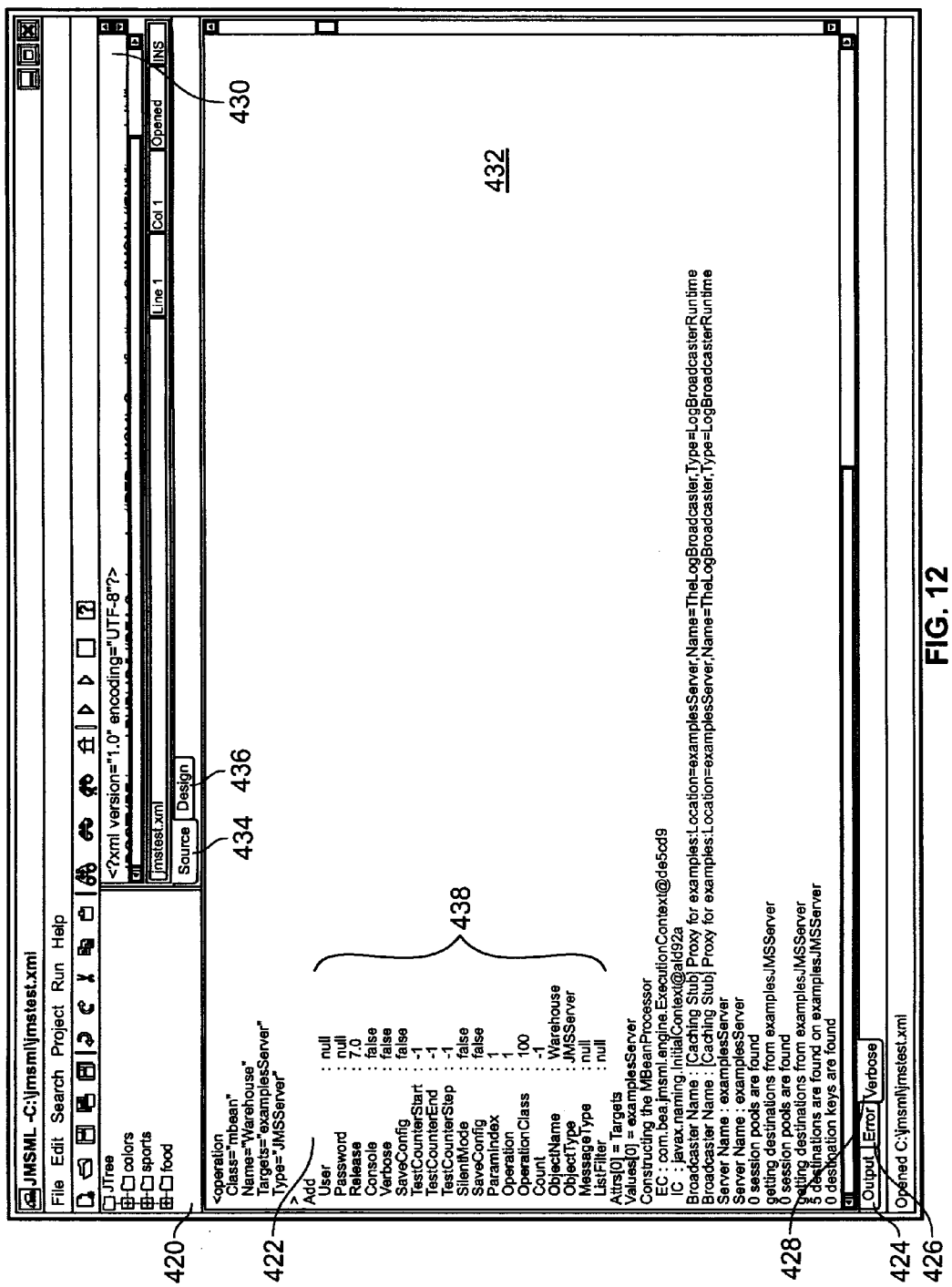
FIG. 12 is a screenshot of the JMSML Integrated Development Environment in accordance with an embodiment of the invention, illustrating the output displayed in the Integrated Development Environment Verbose Window after the command to create a new JMS Server MBean is given.

FIG. 12 further illustrates the type of output which is displayed in the "Verbose" window 432 in an embodiment of the invention. The window 432 displays server output after the user has directed it to list the contents of the "Warehouse" MBean. Of interest in this figure is the server output snippet 438 which illustrates the recitation of initialization parameters back to the user which is of use when debugging JMSML source code.

Figure 13:
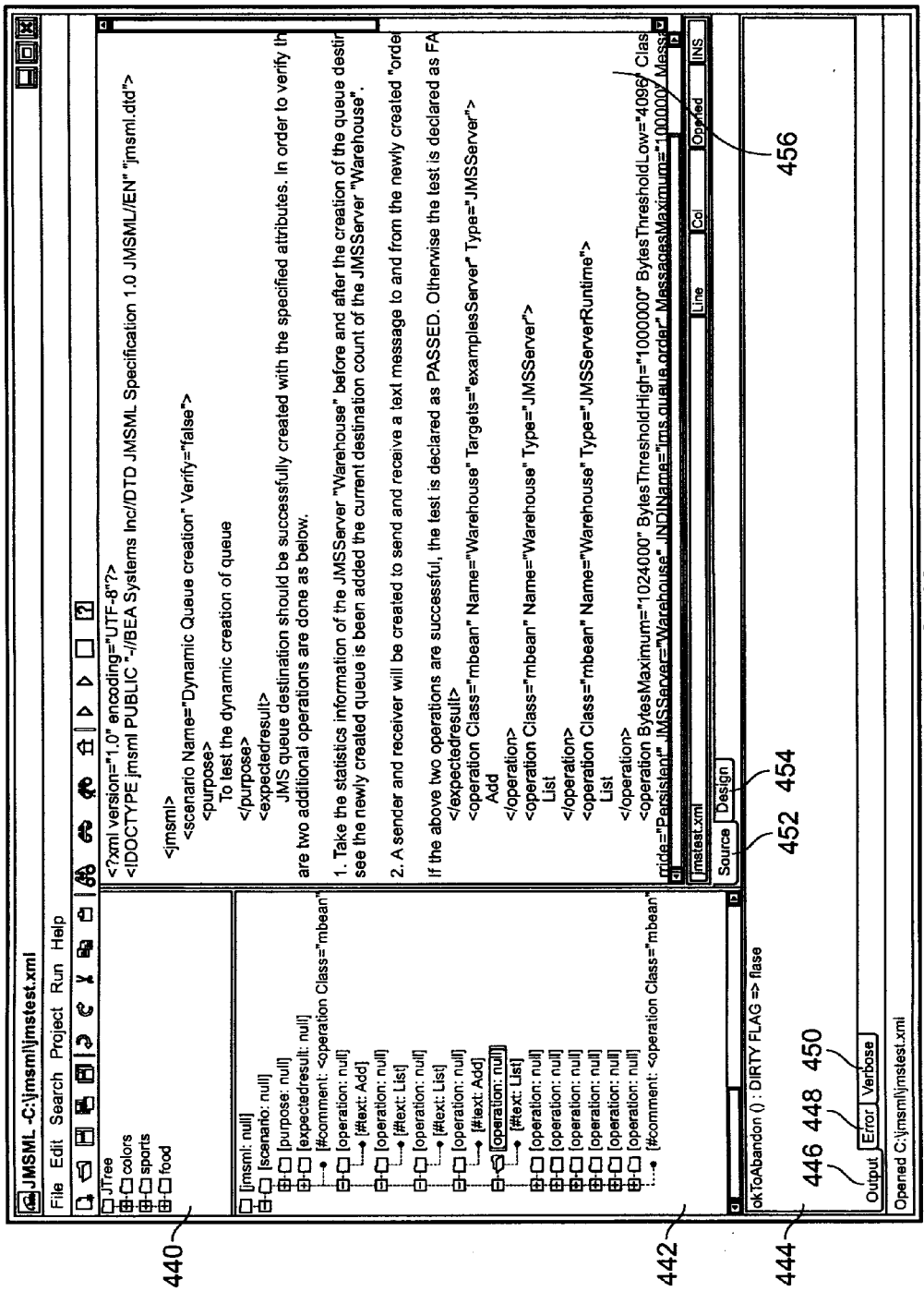
FIG. 13 is a diagram of the JMSML Integrated Development Environment in accordance with an embodiment of the invention, illustrating the type of output displayed in the Integrated Development Environment Output Window after the JMSML source code displayed in the Integrated Development Environment Source Window is executed.

FIG. 13 shows the server output displayed when the IDE user clicks on the "Output" tab 446 and directs the interface to display server output. It will be noted that the appropriate "Output" messages will always be generated for each JMSML operation when any source code shown in the source window 456 is executed, while "Verbose" 450 messages can be turned on or off at the discretion of the executing user. In the embodiment of the invention shown in FIG. 11 the server is informing the IDE user that the state of the source code in the source window 456 has not been changed, by displaying the "Dirty Flag" is "False" icon 444.

Figure 14:
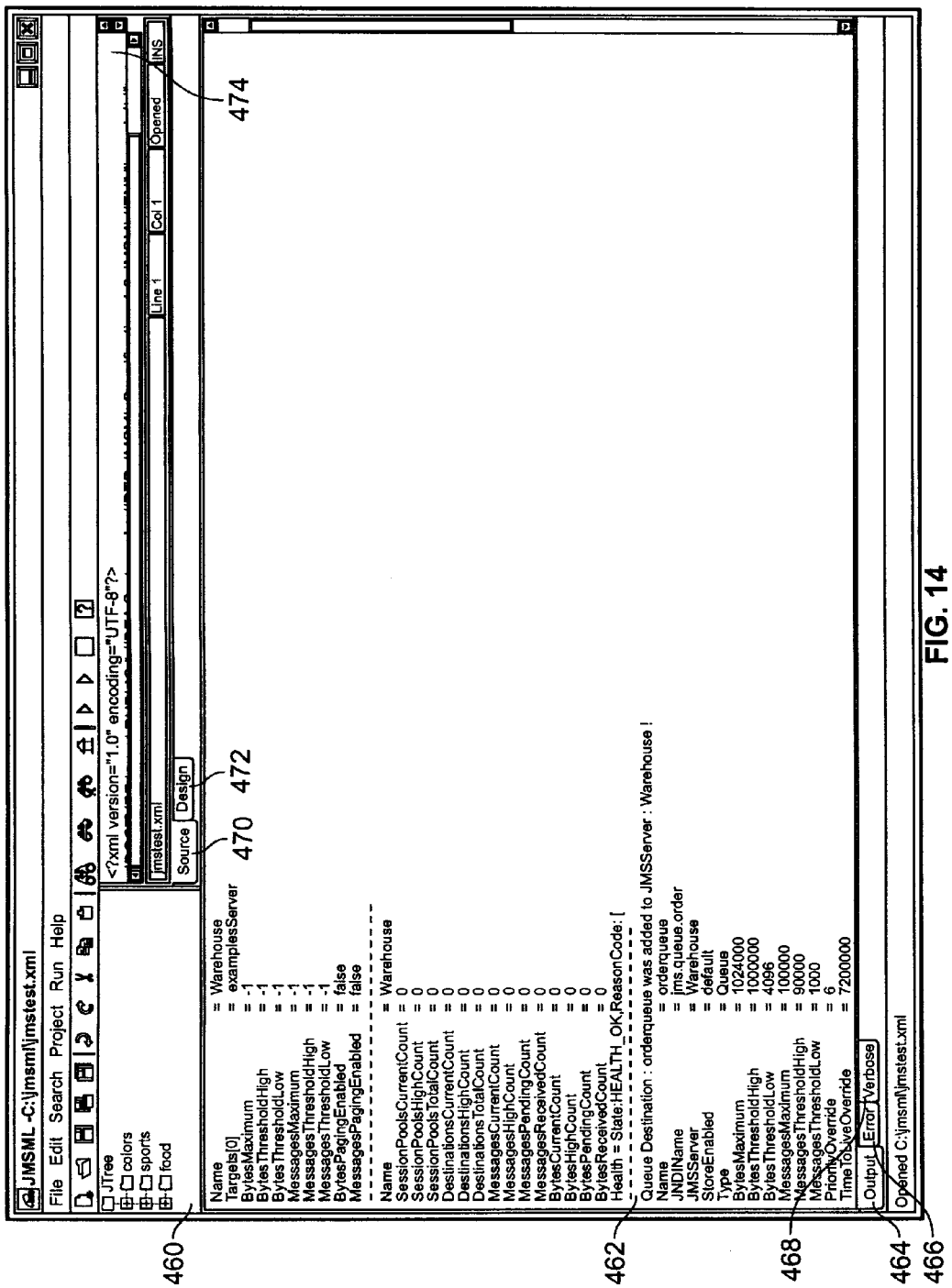
FIG. 14 is a diagram of the JMSML Integrated Development Environment in accordance with an embodiment of the invention, illustrating the type of output displayed in the Integrated Development Environment Output Window after a JMSML command requesting the runtime state information on the "Warehouse" queue is executed, in accordance with an embodiment of the invention.

FIG. 14 illustrates an example of content displayed in the "Output" window 462 indicating successful JMX List operation that is a listing of the previously mentioned "Warehouse" MBean's attributes, following execution of certain JMSML source code shown in the source window 474.

JMSML Markup Language Method as Implemented in a Stand-Alone JAVA Client

Figure 15:
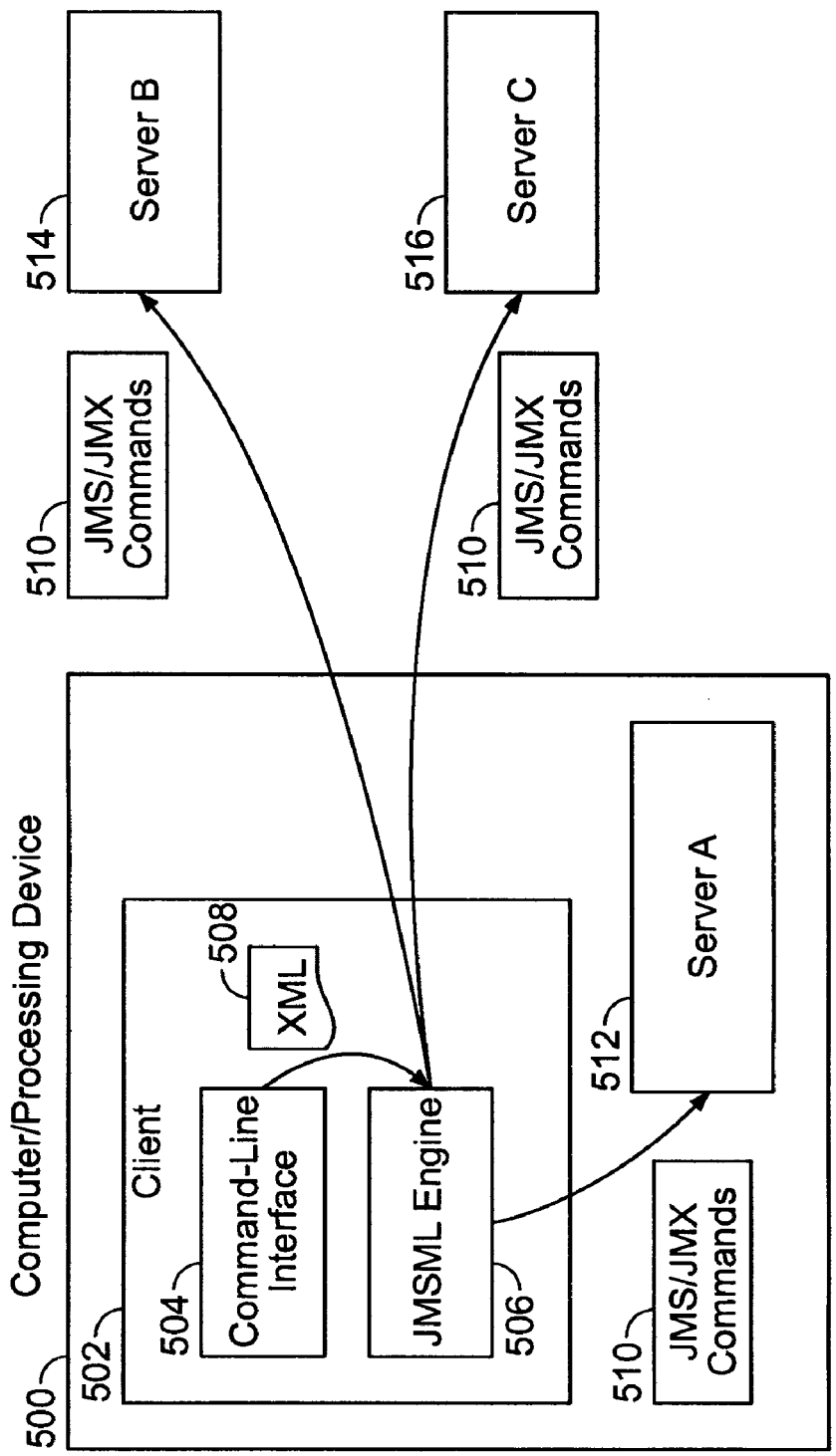
FIG. 15 shows a JMSML system that includes a command-line interface in accordance with an embodiment of the invention.

In one embodiment of the invention, a standard JAVA client coupled with the JMSML system components is provided, along with a JMSML-compliant text file, preferably written in the Extensible Markup Language (XML). FIG. 15 shows a JMSML system that includes a command-line interface in accordance with an embodiment of the invention. The client 502 operates on a computer or similar processing device 500. A comman-line interface 504 is used to access the JMSML engine 506, and to make use of XML files 508. JMS and JMX commands 510 are generated and communicated to servers, including servers 512 located on the same processing device, and/or servers 0.514, 516 located on remote processing devices. In accordance with one embodiment, the XML file is supplied to the JMSML engine, through the JAVA language, by invoking a JAVA method from the command line of the client machine. In this embodiment, the user instantiates an instance of the JMSML method from the command line and supplies default values for various system options at the time the method is invoked. This information is passed to the JMSML engine via the preset flags shown in Table 6:

TABLE 6

| | |
|---|---|
| url: | The URL of the application server (e.g. myappserver://localhost:7001) |
| protocol: | |
| host: | Hostname |
| port: | Port |
| username | User to connect as for the purpose of executing JMS/JMX operations |
| password | Password associated with this user |
| jmsmldir | JMSML directory |
| filename | XML filename |
| wlsrelease | Application server release number |
| verbose | True/False (default=False) |
| console | True/False (default=False) |

For example, in the context of a WebLogic Server environment, the JMSML engine may properly be invoked in conjunction with WebLogic Server using the following command-line syntax:

```
machinename:> java com.bea.jmsml.controller.JMSClient \
            -protocol t3 \
            -host localhost \
            -port 7001 \
            -username jmsmladmin \
            -password jmsmladmin \
            -jmsmldir
                /export/home/jmsmladmin/bea/weblogic700/
                samples/server/config/examples \
            -filename QueueSend.xml
            -verbose true
```

In this embodiment, the JMSML engine, once instantiated, runs entirely within the confines of the stand-alone JAVA client. The JMS and JMX commands are executed on the specified application server, the various output files are written to the specified destination directory, and control is then passed back to the user.

Figure 16:
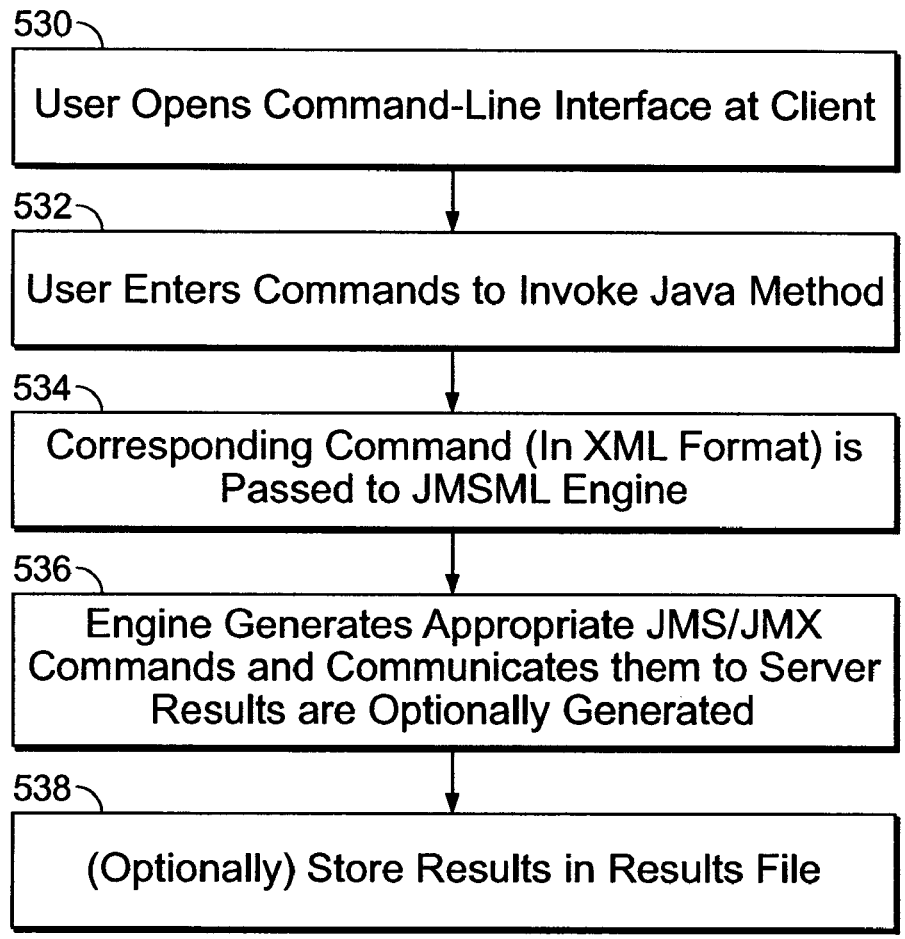
FIG. 16 shows a flowchart of the operation of a JMSML system that includes a command-line interface in accordance with an embodiment of the invention.

FIG. 16 shows a flowchart of the operation of a JMSML system that includes a command-line interface in accordance with an embodiment of the invention. In step 530, the user opens a command-line interface at the client. The user then, in step 532, enters commands to invoke a JAVA method. In step 534, the corresponding command (in XML format) is passed to the JMS engine. In step 536, the JMSML engine generates the appropriate interface specification commands, such as JMS/JMX commands and communicates them to the relevant server. Results may be optionally generated, and in step 538 stored in an optional results file.

It will be evident that, while some of the examples are shown as operating in a WebLogic Server environment, the JMSML language, and particularly the client interface described above, can be used in other environments, and with other types of application server. Also, the client and the server may reside on the same physical machine, or on different machines, depending on the particular implementation.

JMSML Markup Language Method Implemented in a Web Interface

In accordance with another embodiment, the JMSML method may be executed or accessed by a web interface. In this embodiment, the JMSML engine executes on a remote server as a servlet, and the user interacts with the engine using a web browser or web application which resides on his/her client machine. The advantage of this embodiment is that JMS and JMX operations may be performed by a user accessing the web application from any remote location, including via a wide are network (WAN) or the Internet, provided that he/she possesses the proper security credentials.

Figure 17:
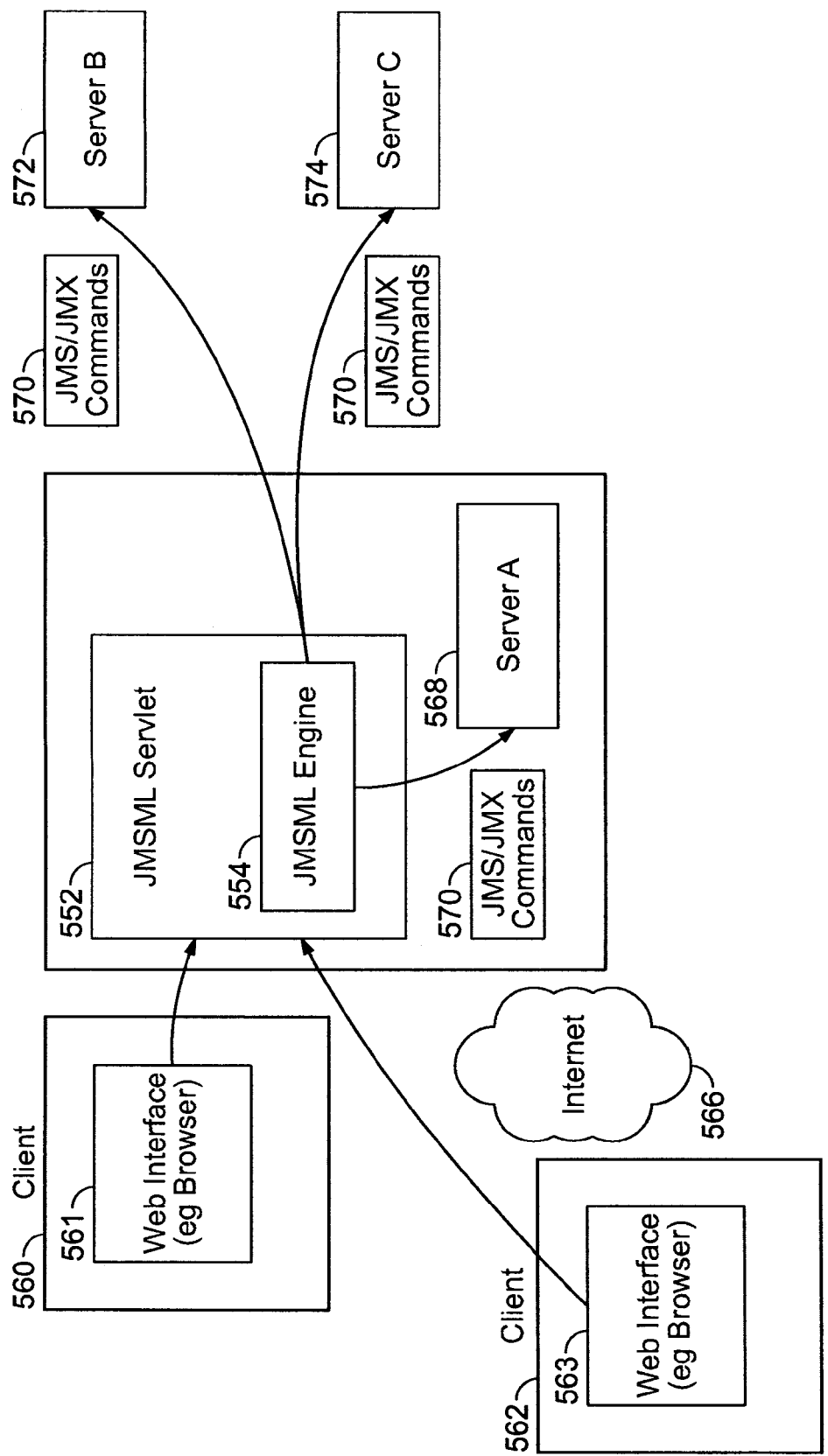
FIG. 17 shows a JMSML system that includes a web interface in accordance with an embodiment of the invention.

FIG. 17 shows a JMSML system that includes a web interface in accordance with an embodiment of the invention. The web interface embodiment provides much more functionality than the stand-alone JAVA client embodiment. As shown in FIG. 17, the system 568 includes a JMSML servlet 552 and a JMSML servlet engine 554. The JMSML servlet accepts commands from a Web Interface 561, 563 (for example a Web Browser) operating at a client 560, 562. The client may be located on a wide area network, or may communicate with the system via the Internet 566. The Web Interface accepts commands from the user via a graphical and/or text-based interface, and communicates those commands to the JMSML servlet. The JMSML engine generates corresponding JMS/JMS commands 570 and communicates them to the appropriate server. The server may be local to the system, or may be remote (572, 574).

Figure 18:
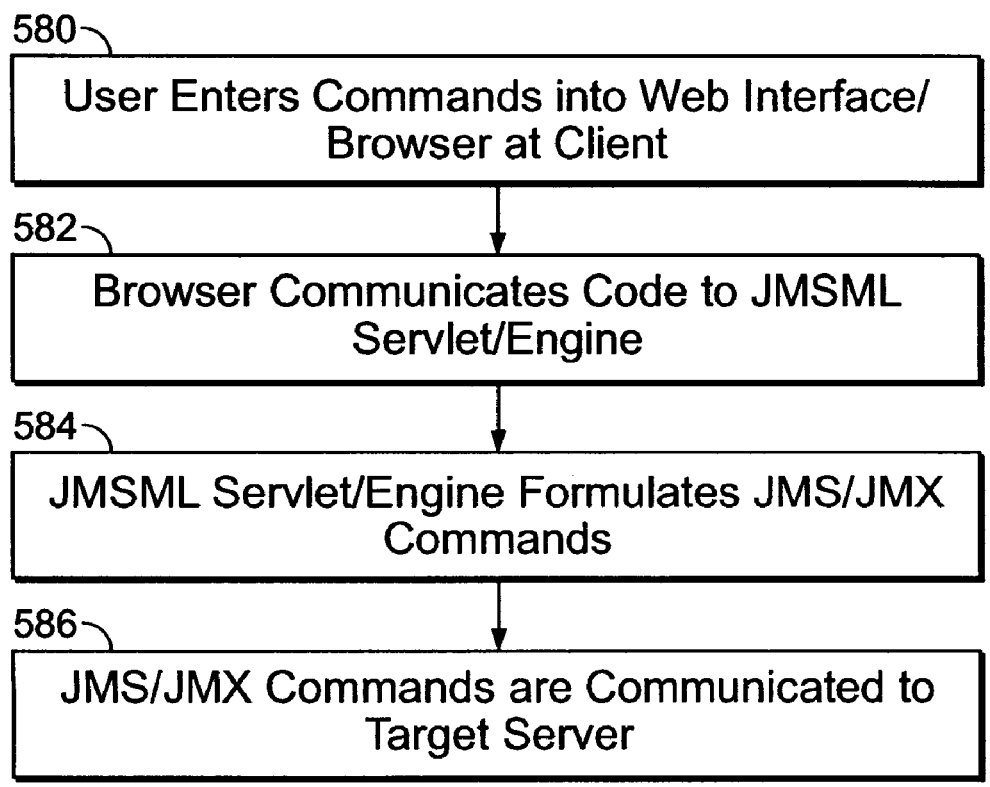
FIG. 18 shows a flowchart of the operation of a JMSML system that includes a Web interface in accordance with an embodiment of the invention.

FIG. 18 shows a flowchart of the operation of a JMSML system that includes a Web interface in accordance with an embodiment of the invention. In step 580, the user enters commands into the Web Interface (the Web browser) at the client. In step 582, the browser communicates the entered codes to the JMSML servlet and JMSML servlet engine. In step 584, the JMSML servlet/engine formulates the corresponding JMS/JMX commands, and in step 586 the JMS/JMX commands are sent to the appropriate servers.

Figure 19:
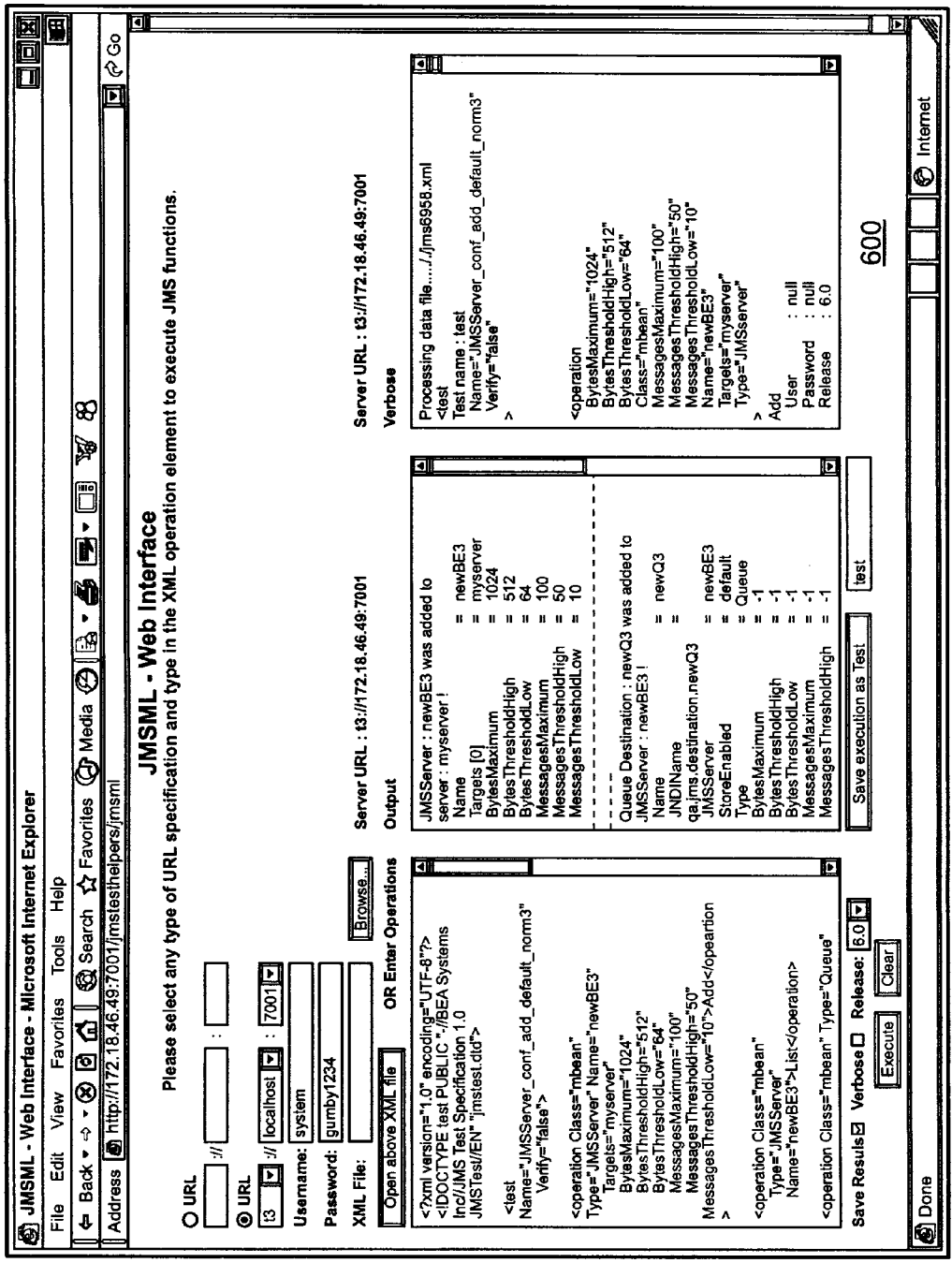
FIG. 19 shows a screenshot of a Web interface in accordance with an embodiment of the invention.

FIG. 19 shows a screenshot of a Web interface 600 in accordance with an embodiment of the invention. In some embodiments the user can interact with the JMSML engine via a Graphical User Interface (GU I). "TextArea" objects are supplied for the user to enter the required protocol, host name and port information, or alternatively, the user may simply select frequently used values for these attributes from a pull-down list. The user may then either identify the XML file to be passed to the engine, or manually enter the JMSML-compliant code into a text box. If he/she chooses to use a pre-created XML file and is unaware of the file's exact location, then the user may browse their local file system by clicking the "Browse" button which, in turn, will trigger another GUI and provide a representation of his local file system. The specific functionality of this second GUI will vary depending on the particular implementation which operating system is running on the client machine. After locating the desired XML file and clicking on it, the details of the filename will be automatically filled into the "TextArea" object for the "XML File:" prompt. Upon clicking the button labelled "Open above XML file", the code contained in the XML file will be loaded into the code window.

Once the user is satisfied that the code appearing in the code window should be executed, they can elect to use the "Verbose" option or specify, for example, a WebLogic Server Release Version by clicking the checkbox located adjacent to the desired option. The "Execute" button may now be clicked and, upon completion, the "verbose" and "standard output" results will be displayed in a window labeled as such. Should errors arise, the user needs only to make the required correction in the code window and re-execute his/her changes.

JMSML Use-Case Analyses With Working Example

This section describes one example of how to use JMSML as a testing tool to test BEA WebLogic JMS and JMX.

Once testing scenarios are identified, they can be easily translated into JMSML operations, grouped as testing scenarios using <scenario> with Verify attribute set to "false" and saved as a JMSML program. This test program can be executed using one of the JMSML execution models. After the successful execution, an output file is created with the same name as the input JMSML program and with an .out extension. It is verified manually for correctness and then saved as a benchmark file (again in the same name as the input JMSML program but with a .bmk extension).

Later, whenever the same JMSML program is executed, with the "Verify" attribute of the <scenario> element set to "true", JMSML treats that input JMSML program as a test, and the output file is automatically compared with the corresponding benchmark file for the test verification. If the benchmark and the output file matches, then the test is declared as PASSED. Otherwise, it will be declared as FAILED.

Example. Test the dynamic creation, management, and monitoring of the JMS administered objects and the message send, receive features of JMS.

Testing Scenario: Create a JMSServer named "Warehouse" with all the default attribute values and deploy it on a WebLogic Server instance named "examplesServer". Create a queue destination named "orderqueue" with all the attribute values explicitly defined, add it to the JMSServer named "Warehouse", bind it into JNDI as "jms.queue.order", send/receive messages to this queue, and at the end delete both the queue "orderqueue" destination and the "Warehouse" JMSServer.

The following JMSTEST.XML sample is the JMSML representation of the Testing Scenario defined above.

```
<?xml version="1.0" encoding="UTF-8" ?>
<!DOCTYPE jmsml PUBLIC "-//BEA Systems Inc//DTD
JMSML  Version  1.0 JMSML//EN" "jmsml.dtd">
<jmsml>
    <scenario Name="Dynamic Queue creation" Verify="false">
        <purpose>
To test the dynamic creation of queue
        </purpose>
        <expectedresult>
JMS queue destination should be successfully created with the specified
attributes. In order to verify this, two additional operations are performed
as shown below.
1. Take the statistics information of the JMSServer
"Warehouse", before and after the creation of the queue destination, to
see if the newly created queue has been added to the current destination
count of the JMSServer "Warehouse".
2. A sender and receiver will be created to send and receive
a text
message to and from the newly created "orderqueue".
If the above two operations are successful, the test is declared as
PASSED.
Otherwise the test is declared as FAILED.
        </expectedresult>
        <operation Class="mbean"
Type="JMSServer"
Name="Warehouse"
Targets="examplesServer">
            >Add</operation>
            <operation Class="mbean"
Type="JMSServer"
Name="Warehouse">
            >List</operation>
            <operation Class="mbean"
Type="JMSServerRuntime"
Name="Warehouse">
            >List</operation>
            <operation Class="mbean" Type="Queue"
Name="orderqueue"
JMSServer="Warehouse"
JNDIName="jms.queue.order"
BytesMaximum="1024000"
BytesThresholdHigh="1000000"
BytesThresholdLow="4096"
MessagesMaximum="100000"
MessagesThresholdHigh="90000"
MessagesThresholdLow="1000"
PriorityOverride="6"
TimeToLiveOverride="7200000"
DeliveryModeOverride="Persistent"
StoreEnabled="default"
            >Add</operation>
            <operation Class="mbean" Type="Queue"
Name="orderqueue">
            >List</operation>
            <operation Class="mbean" Type="JMSServerRuntime"
Name="Warehouse">
            >List</operation>
```

-continued

```
    <operation Class="mbean" Type="DestinationRuntime"
Name="orderqueue"
        >List</operation>
    <operation Class="message" Type="Text"
Name="sender"
Factory="weblogic.examples.jms.QueueConnectionFactory"
Queue="jms.queue.order"
Body="Test message to order queue"
        >Send</operation>
    <operation Class="mbean" Type="DestinationRuntime"
Name="orderqueue"
        >List</operation>
    <operation Class="message" Type="Text"
Mode="Synchronous"
Name="receiver"
Factory="weblogic.examples.jms.QueueConnectionFactory"
Queue="jms.queue.order"
        >Receive</operation>
    <operation Class="mbean" Type="DestinationRuntime"
Name="orderqueue"
        >List</operation>
    <operation Class="mbean" Type="Queue"
Name="orderqueue"
        >Remove</operation>
    <operation Class="mbean" Type="JMSServerRuntime"
Name="Warehouse"
        >List</operation>
    <operation Class="mbean" Type="JMSServer"
Name="Warehouse"
        >Remove</operation>
    </scenario>
</jmsml>
```

Once a JMSML program is written, it can be run against a WebLogic Server instance. Currently, JMSML provides three different ways to execute a program. See the following section on "JMSML Execution Models" to get detailed information on these different ways. In order to continue with this example, a standalone command-line execution method is shown below:

```
java com.bea.jmsml.controller.JMSClient \
-protocol t3 \
-host localhost \
-port 7001 \
    -username weblogic \
-password weblogic \
    -filename jmstest.xml
```

The command line above assumes the following about the execution environment:

An instance of WebLogic Server named "examplesServer" is running on "localhost" and is listening on the port "7001" with the "t3" protocol enabled.

WebLogic security is set up such that a user named "weblogic" with a password of "weblogic" is configured with permissions for creating and accessing JMS server components.

A valid JMS connection factory is deployed on the "examplesServer" and is bound to JNDI as "weblogic.examples.jms. QueueConnectionFactory".

The test program shown in Listing 3 "jmstest.xml" is saved in the current directory along with the "jmsml.dtd" file.

After the successful execution of the above command, the following message will be printed out to the stdout:

```
*** jmstest processed *** \n*** Please see ./jmstest.out for the results
***
```

At this time, an output file named "jmstest.out" will exist in the current directory, containing all the operations execution results, as shown in the "jmstest.out" below.

Listing 2

```
JMSServer : Warehouse was added to server : examplesServer !
Name                        = Warehouse
Targets [0]                 = examplesServer
BytesMaximum                = -1
BytesThresholdHigh          = -1
BytesThresholdLow           = -1
MessagesMaximum             = -1
MessagesThresholdHigh       = -1
MessagesThresholdLow        = -1
--------------------------------------------
Name                        = Warehouse
SessionPoolsCurrentCount    = 0
SessionPoolsHighCount       = 0
SessionPoolsTotalCount      = 0
DestinationsCurrentCount    = 0
DestinationsHighCount       = 0
DestinationsTotalCount      = 0
MessagesCurrentCount        = 0
MessagesHighCount           = 0
MessagesPendingCount        = 0
MessagesReceivedCount       = 0
BytesCurrentCount           = 0
BytesHighCount              = 0
BytesPendingCount           = 0
BytesReceivedCount          = 0
--------------------------------------------
Queue Destination : orderqueue was added to JMSServer : Warehouse !
Name                        = orderqueue
JNDIName                    = jms.queue.order
JMSServer                   = Warehouse
StoreEnabled                = default
Type                        = Queue
BytesMaximum                = 1024000
BytesThresholdHigh          = 1000000
BytesThresholdLow           = 4096
MessagesMaximum             = 100000
MessagesThresholdHigh       = 90000
MessagesThresholdLow        = 1000
PriorityOverride            = 6
TimeToLiveOverride          = 7200000
DeliveryModeOverride        = Persistent
--------------------------------------------
Name                        = Warehouse
SessionPoolsCurrentCount    = 0
SessionPoolsHighCount       = 0
SessionPoolsTotalCount      = 0
DestinationsCurrentCount    = 1
DestinationsHighCount       = 1
DestinationsTotalCount      = 1
MessagesCurrentCount        = 0
MessagesHighCount           = 0
MessagesPendingCount        = 0
MessagesReceivedCount       = 0
BytesCurrentCount           = 0
BytesHighCount              = 0
BytesPendingCount           = 0
BytesReceivedCount          = 0
--------------------------------------------
Name                        = orderqueue
ConsumersCurrentCount       = 0
ConsumersHighCount          = 0
ConsumersTotalCount         = 0
MessagesCurrentCount        = 0
MessagesHighCount           = 0
MessagesPendingCount        = 0
MessagesReceivedCount       = 0
```

Listing 2 (continued)

```
BytesCurrentCount                = 0
BytesHighCount                   = 0
BytesPendingCount                = 0
BytesReceivedCount               = 0
--------------------------------------------
Name                             = orderqueue
ConsumersCurrentCount            = 0
ConsumersHighCount               = 0
ConsumersTotalCount              = 0
MessagesCurrentCount             = 1
MessagesHighCount                = 1
MessagesPendingCount             = 0
MessagesReceivedCount            = 1
BytesCurrentCount                = 27
BytesHighCount                   = 27
BytesPendingCount                = 0
BytesReceivedCount               = 27
--------------------------------------------
@receiveMessage( ) : Message Received [0] : Test message to order queue
Name                             = orderqueue
ConsumersCurrentCount            = 1
ConsumersHighCount               = 1
ConsumersTotalCount              = 1
MessagesCurrentCount             = 0
MessagesHighCount                = 1
MessagesPendingCount             = 0
MessagesReceivedCount            = 1
BytesCurrentCount                = 0
BytesHighCount                   = 27
BytesPendingCount                = 0
BytesReceivedCount               = 27
--------------------------------------------
Queue : orderqueue was removed from JMSServer : Warehouse !
--------------------------------------------
Name                             = Warehouse
SessionPoolsCurrentCount         = 0
SessionPoolsHighCount            = 0
SessionPoolsTotalCount           = 0
DestinationsCurrentCount         = 1
DestinationsHighCount            = 1
DestinationsTotalCount           = 1
MessagesCurrentCount             = 0
MessagesHighCount                = 1
MessagesPendingCount             = 0
MessagesReceivedCount            = 1
BytesCurrentCount                = 0
BytesHighCount                   = 27
BytesPendingCount                = 0
BytesReceivedCount               = 27
--------------------------------------------
JMSServer : Warehouse was removed from server : examplesServer !
--------------------------------------------
```

Once the above output is manually verified for correctness, you can easily make this a valid reusable WebLogic JMS test case by doing two things:

1. Rename the "jmstest.out" file to "jmstest.bmk"
2. Edit the "jmstest.xml" file by changing the Verify attribute value to "true" in the <scenario> element.

The next time the same command line is executed, JMSML then treats the "jmstest.xml" as a test case and prints out the test pass/fail result to the stdout. As can be seen, without writing a JAVA program, we have quickly written a complete test case for BEA WebLogic JMS and JMX features.

Jmsml.dtd File

The following is an example of a JMSML Document Type Definition file.

Listing 3

```
<?xml version='1.0' encoding='UTF-8' ?>
<!ENTITY % message.types   "Text|Bytes|Object|XML|Map">
<!ENTITY % message         "Message">
<!ENTITY % system          "System">
<!ENTITY % all             "All">
<!ENTITY % jms.header
"JMSMessageID|
JMSCorrelationID|
JMSDestination|
JMSReplyTo|
JMSTimestamp|
JMSExpiration|
JMSPriority|
JMSDeliveryMode|
JMSType|
JMSRedelivered">
<!ENTITY % runtime.mbeans
"ServerRuntime|
ConnectionFactoryRuntime|
ConnectionRuntime|
JMSServerRuntime|
QueueRuntime|
TopicRuntime|
DestinationRuntime|
SessionPoolRuntime|
SessionRuntime|
ConnectionConsumerRuntime|
ConsumerRuntime|
ProducerRuntime|
StoreRutime|
FileStoreRuntime|
JDBCStoreRuntime|
TemplateRuntime|
DestinationKeyRuntime">
<!ENTITY % config.mbeans
"Server|
MigratableTarget|
Target|
ConnectionFactory|
JMSServer|
Queue|
Topic|
Destination|
SessionPool|
ConnectionConsumer|
FileStore|
JDBCStore|
Template|
DestinationKey">
<!ENTITY % jms.clients
"Sender|
Publisher|
SyncQueueReceiver|
AsyncQueueReceiver|
SyncTopicSubscriber|
AsyncTopicSubscriber|
Browser">
<!ENTITY % notification.objects
"NotificationFilter|NotificationListener">
<!ENTITY % mode             "Synchronous|Asynchronous">
<!ENTITY % transactiontype  "JMS|User">
<!ENTITY % transaction      "commit|rollback">
<!ENTITY % ackmode
"NoAck|
Auto|
ClientYes|
ClientNo|
Multicast">
<!ENTITY % txpolicy         "TX_ONE|TX_PREVIOUS|
                             TX_ALL">
<!ENTITY % deliverymode     "Persistent|Non-Persistent">
<!ENTITY % timeunit         "Millis|Seconds|Minutes|Hours">
<!ELEMENT jmsml             (scenario*|operation+)>
<!ELEMENT scenario          (purpose?, expectedresult?,
                             operation+)>
<!ATTLIST scenario Name     CDATA        #REQUIRED
                   Verify   (true|false) #REQUIRED
```

Listing 3 (continued)

| | | |
|---|---|---|
| Persistence | (true\|false) | #IMPLIED |
| SortedVerification | (true\|false) | #IMPLIED> |
| <!ELEMENT purpose | (#PCDATA)> | |
| <!ELEMENT expectedresult | (#PCDATA)> | |
| <!ELEMENT operation | (#PCDATA)> | |
| <!ATTLIST operation | | |
| AsyncQueueReceiver | CDATA | #IMPLIED |
| Ack | (%ackmode;) | #IMPLIED |
| AckAfterMessages | CDATA | #IMPLIED |
| AsyncTopicSubscriber | CDATA | #IMPLIED |
| Body | CDATA | #IMPLIED |
| BytesMaximum | CDATA | #IMPLIED |
| BytesThresholdHigh | CDATA | #IMPLIED |
| BytesThresholdLow | CDATA | #IMPLIED |
| BytesPagingEnabled | CDATA | #IMPLIED |
| Class | (message\| mbean \| system) | #REQUIRED |
| Condition | CDATA | #IMPLIED |
| Count | CDATA | #IMPLIED |
| ConnectionFactory | CDATA | #IMPLIED |
| ConnectionConsumer | CDATA | #IMPLIED |
| Config | CDATA | #IMPLIED |
| Configured | CDATA | #IMPLIED |
| ConnectionFactoryRuntime | CDATA | #IMPLIED |
| ConnectionConsumerRuntime | CDATA | #IMPLIED |
| ClientID | CDATA | #IMPLIED |
| Cluster | CDATA | #IMPLIED |
| Destination | CDATA | #IMPLIED |
| DestinationServerUp | (true\|false) | #IMPLIED |
| DeliveryMode | (%deliverymode;) | #IMPLIED |
| DeliveryModeOverride | (%deliverymode;) | #IMPLIED |
| DestinationKey | CDATA | #IMPLIED |
| DestinationServerName | CDATA | #IMPLIED |
| DestinationKeys | CDATA | #IMPLIED |
| DestinationRuntime | CDATA | #IMPLIED |
| DefaultRedeliveryDelay | CDATA | #IMPLIED |
| Durable | CDATA | #IMPLIED |
| ErrorDestination | CDATA | #IMPLIED |
| ExpectedException | CDATA | #IMPLIED |
| FileStoreRuntime | CDATA | #IMPLIED |
| FileStore | CDATA | #IMPLIED |
| Filter | CDATA | #IMPLIED |
| FlowMaximum | CDATA | #IMPLIED |
| FlowMinimum | CDATA | #IMPLIED |
| FlowInterval | CDATA | #IMPLIED |
| FlowSteps | CDATA | #IMPLIED |
| FlowControlEnabled | CDATA | #IMPLIED |
| Factory | CDATA | #IMPLIED |
| JDBCStoreRuntime | CDATA | #IMPLIED |
| JDBCStore | CDATA | #IMPLIED |
| JMSCorrelationID | CDATA | #IMPLIED |
| JMSServerRuntime | CDATA | #IMPLIED |
| JMSServer | CDATA | #IMPLIED |
| JNDIName | CDATA | #IMPLIED |
| JMSMessageID | CDATA | #IMPLIED |
| JMSReplyTo | CDATA | #IMPLIED |
| JMSDestination | CDATA | #IMPLIED |
| JMSDeliveryMode | CDATA | #IMPLIED |
| JMSExpiration | CDATA | #IMPLIED |
| JMSTimestamp | CDATA | #IMPLIED |
| JMSRedelivered | CDATA | #IMPLIED |
| JMSType | CDATA | #IMPLIED |
| JMSPriority | CDATA | #IMPLIED |
| MessagesMaximum | CDATA | #IMPLIED |
| MessagesThresholdHigh | CDATA | #IMPLIED |
| MessagesThresholdLow | CDATA | #IMPLIED |
| MessagesPagingEnabled | CDATA | #IMPLIED |
| MigratableTarget | CDATA | #IMPLIED |
| MigrateDestination | CDATA | #IMPLIED |
| Mode | (%mode) | #IMPLIED |
| Name | CDATA | #IMPLIED |
| NotificationFilter | CDATA | #IMPLIED |
| NotificationListener | CDATA | #IMPLIED |
| PagingStore | CDATA | #IMPLIED |
| Persistent | (true\|false) | #IMPLIED |
| Priority | CDATA | #IMPLIED |
| PriorityOverride | CDATA | #IMPLIED |
| Print | (%jms.header;) | #IMPLIED |
| PrintMesssage | (true\|false) | #IMPLIED |
| PrintPerformance | CDATA | #IMPLIED |
| Queue | CDATA | #IMPLIED |
| QueueRuntime | CDATA | #IMPLIED |
| RedeliveryDelayOverride | CDATA | #IMPLIED |
| RedeliveryLimit | CDATA | #IMPLIED |
| Silent | (true\|false) | #IMPLIED |
| ShutdownMessage | CDATA | #IMPLIED |
| Size | CDATA | #IMPLIED |
| SleepBeforeAck | CDATA | #IMPLIED |
| SleepAfterAck | CDATA | #IMPLIED |
| SleepBeforePublish | CDATA | #IMPLIED |
| SleepAfterPublish | CDATA | #IMPLIED |
| SleepBeforeReceive | CDATA | #IMPLIED |
| SleepAfterReceive | CDATA | #IMPLIED |
| SleepBeforeSend | CDATA | #IMPLIED |
| SleepAfterSend | CDATA | #IMPLIED |
| Selector | CDATA | #IMPLIED |
| Server | CDATA | #IMPLIED |
| SessionPool | CDATA | #IMPLIED |
| Store | CDATA | #IMPLIED |
| StoreEnabled | CDATA | #IMPLIED |
| Severity | CDATA | #IMPLIED |
| Subsystem | CDATA | #IMPLIED |
| Sender | CDATA | #IMPLIED |
| SyncQueueReceiver | CDATA | #IMPLIED |
| SyncTopicSubscriber | CDATA | #IMPLIED |
| SessionPoolRuntime | CDATA | #IMPLIED |
| SourceServerUp | (true\|false) | #IMPLIED |
| SortAttributes | (true\|false) | #IMPLIED |
| Type | (%config.mbeans;\| %runtime.mbeans;\| %jms.clients;\| %notification.objects;\| %message;\|%system;\| %message.types;\| %all;) | #REQUIRED |
| Target | CDATA | #IMPLIED |
| TargetServer | CDATA | #IMPLIED |
| Targets | CDATA | #IMPLIED |
| Topic | CDATA | #IMPLIED |
| TopicRuntime | CDATA | #IMPLIED |
| Template | CDATA | #IMPLIED |
| TimeToDeliver | CDATA | #IMPLIED |
| TimeToDeliverOverride | CDATA | #IMPLIED |
| Time | CDATA | #IMPLIED |
| Transacted | (true\|false) | #IMPLIED |
| TransactionType | (transactiontype;) | #IMPLIED |
| TransactionPolicy | (%txpolicy;) | #IMPLIED |
| Transaction | (%transaction;) | #IMPLIED |
| Unit | (%timeunit;) | #IMPLIED |
| Used | CDATA | #IMPLIED |
| Wait | CDATA | #IMPLIED> |

JMSML Operation Attribute Tables Quick Reference

In this section, all the JMS operation attributes are listed in table format for quick reference.

Common Attributes of the "message class" operations (Send, Receive, Publish and Subscribe) include:

TABLE 7

| Attribute Name | Description | Required? | Valid Values | Default |
|---|---|---|---|---|
| Name | Name of the message producer/ consumer (and session) | Yes | A valid Java String | "" |

TABLE 7-continued

| Attribute Name | Description | Required? | Valid Values | Default |
|---|---|---|---|---|
| Type | Type of the message to send | Yes | Text\|Object\|Bytes\|Stream\|Map\|XML | "Text" |
| Factory | JNDI Name of the JMS Connection factory | Yes | JNDI Name | "" |

TABLE 8

Common Attributes of the message Produce Operations (Send and Publish) include:

| Attribute | Description | Required? | Valid Values | Default |
|---|---|---|---|---|
| Queue | JNDI Name of the JMS Queue Destination | Yes | JNDI Name | "" |
| Ack | JMSSession acknowledgement Mode | No | "Auto\|clientYes\|clientNo\|NoAcknowledge" | "Auto" |
| Transacted | JMSSession transacted option | No | "true\|false" | "false" |
| TransactionType | Type of transaction | No | "JMS\|User" | "" |
| Transaction | Transaction result | No | "commit\|rollback" | "" |
| Body | Text Message content | No | "A valid Java String" | A string of "a"of length 1024 |
| Size | Size of the default content of Text Message | No | "A valid Integer" | "1024" |
| Count | Number of messages to send | No | "A Valid Integer" | "1" |
| Priority | JMS Priority of the message being send | No | "A valid value between 1 to 9" | "producer's default priority" |
| TimeToLive | Expiration time of the message being send in milliseconds | No | "A valid Integer value" or "All" | Infinite |
| JMSCorrelationID | JMS Message header field | No | "A valid String" | "" |
| JMSType | JMS Message header field | No | "A valid String" | "" |
| JMSReplyTo | JMS Message header field | No | "A valid JMS destination JNDI name" | "" |

Attributes specific to message Send Operation include:

TABLE 9

| Attribute | Description | Required? | Valid Values | Default |
|---|---|---|---|---|
| Queue | JNDI Name of the JMS Queue Destination | Yes | JNDI Name | "" |
| SleepBeforeSend | Time in seconds, to sleep before sending the message | No | "A valid Integer" | "" |
| SleepAfterSend | Time in seconds to sleep after sending the message | No | "A valid integer" | "" |

Attributes specific to message Publish Operation include:

TABLE 10

| Attribute | Description | Required? | Valid Values | Default |
|---|---|---|---|---|
| Topic | JNDI Name of the JMS Topic Destination | Yes | JNDI Name | "" |
| SleepBeforePublish | Time in seconds, to sleep before publishing message | No | "A valid Integer" | "" |
| SleepAfterPublish | Time in seconds to sleep after publishing the message | No | "A valid Integer" | "" |

The following is the XML representation of the Send and Publish operations, with all the possible attribute/values. The optional attributes are shown within the comments tags (<-- -->).

```
<operation
Class="message"
Type="Text"
Name="A Valid Java String"
Factory="JNDI Name of the JMS Connection Factory"
Queue|Topic ="JNDI Name of the JMS Queue/Topic Destination"
<-- Ack="Auto|ClientYes|ClientNo|NoAcknowledge" -->
<-- Transacted="true|false" -->
<-- TransactionType="JMS|User" -->
<-- Transaction="commit|rollback" -->
     <-- Body="A valid Java String" -->
<-- Size="A valid Integer value" -->
     <-- Count="A valid Integer value" -->
     <-- Priority="A value between 1 to 9" -->
     <-- TimeToLive="A valid Integer value". -->
     <-- JMSCorrelationID="A valid value per JMS Specification" -->
     <-- JMSType="As per JMS Specification for JMSHeader fields" -->
     <-- JMSReplyTo="As per JMS Spec for JMSHeader fields" -->
     <-- SleepBefore{Send|Publish}="A valid integer value" -->
     <-- SleepAfter{Send|Publish}="A valid integer value" -->
<-- ExpectedException="A valid Java Exception class Name" -->
>Send|Publish</operation>
```

Attributes of a message Consumer (Receive and Subscribe) Operations include:

TABLE 11

| Attribute | Description | Required? | Valid Values | Default Value |
|---|---|---|---|---|
| Mode | Receiving mode of the consumer | No | "Synchornous\|Asynchronous" | "Synchronous" |
| Wait | How long to wait in case of Synchronous receive | No | "A valid integer" will be treaded in seconds" or "No" for receive with noWait API which will return immediately | " " (blocking receive) |
| Ack | JMSSession acknowledgement Mode | No | "Auto\|ClientYes\|ClientNo\|NoAcknowledge" | "Auto" |
| AckAfterMessages | Indicates the consumer to acknowledge after the every "number" of receives | No | "A valid Integer" | "1" |
| Transacted | JMSSession transacted option | No | "true\|false" | "false" |
| TransactionType | Type of transaction | No | "JMS\|User" | "" |
| Transaction | Transaction result | No | "commit\|rollback" | "" |
| TransactionPolicy | Indicates the consumer to execute the transaction operation as per the policy | No | "TX_ONE\|TX_PREVIOUS\|TX_ALL" | "TX_ONE" |
| Count | Indicates the number of messages to be received by a synchronous receiver | No | "A Valid Integer" or "All" | "1" |
| Print | Indicates the receiver to Print the JMS Header properties | No | "A valid JMS message Header field name" | "" |
| Selector | Message selector used for receive | No | A valid selector expression as per JMS Specification | "" |

Attributes specific to message Receive Operation include:

TABLE 12

| Attribute | Description | Required? | Valid Values | Default Value |
|---|---|---|---|---|
| Queue | JNDI Name of the JMS Queue Destination | Yes | JNDI Name | "" |
| SleepBeforeReceive | Time in seconds, to sleep before receiving the message | No | "A valid Integer" | "" |
| SleepAfterReceive | Time in seconds, to sleep before receiving the message | No | "A valid Integer" | "" |

Attributes specific to message Subscribe Operation include:

TABLE 13

| Attribute | Description | Required? | Valid Values | Default Value |
|---|---|---|---|---|
| Topic | JNDI Name of the JMS Topic Destination | Yes | JNDI Name | "" |
| Durable | Enables the creation of Durable subscription by this name | No | A valid Java String | "" |
| SleepBeforeSubscribe | Time in seconds, to sleep before subscribing the message | No | "A valid Integer" | "" |
| SleepAfterSubscribe | Time in seconds, to sleep before subscribing the message | No | "A valid Integer" | "" |

The following is the XML representation of the Receive and Subscribe operations, with all the possible attribute/ values. The optional attributes are shown within the comments tags (<-- -->).

```
<operation
Class="message"
Type="Text"
Name="A Valid Java String"
Factory="JNDI Name of the JMS Connection Factory"
Queue|Topic="JNDI Name of the JMS Queue/Topic Destination"
<-- Ack="Auto|ClientYes|ClientNo|NoAcknowledge" -->
<-- Transacted="true|false" -->
<-- TransactionType="JMS|User" -->
<-- Transaction="commit|rollback" -->
    <-- Count="A valid Integer value" -->
    <-- Print="A valid JMSHeader field name" -->
    <-- Selector="A valid message selector expression" -->
    <-- SleepBefore{Receive|Subscribe}="A valid integer value" -->
    <-- SleepAfter{Receive|Subscribe}="A valid integer value" -->
<-- ExpectedException="A valid Java Exception class Name" -->
<-- Durable="A valid Java String" -->
>Receive|Subscribe</operation>
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that additional JMS markup language (JMSML) operations can be developed in accordance with the specifications described herein. The JMSML methodology and language may also be used with application servers in addition to the WebLogic Server. It will also be evident that other types of command-line environment, interfaces, and Integrated Design Environment (IDE) can be devised to allow a software developer to design, test, and implement JMSML-based applications. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system including a command-line interface for use with a mark-up language, to abstract complexity of enterprise service application program interface (API) programming, comprising:
    a server computer including a server processor and a plurality of enterprise service API for one of messaging, operation, administration, and management monitoring;
    a client computer including a processing device and a client operating thereon;
    an application including a command-line user interface that executes on the client and that receives user input markup language commands, including the name of at least one enterprise service API at the server computer, and operations to be performed therewith;

a client command processor that executes on the client and that validates the user input markup language commands, and, for each markup language command converts the markup language command into a command object for communication to a command dispatcher;

a client command dispatcher that executes on the client and that receives command objects from the command processor and, for each command object, assigns the command object to one of a plurality of categories corresponding to the enterprise service API specified in the user input markup language commands; and a plurality of client processor modules, including a processor module specific to each category of enterprise service API, wherein each processor module receives the command objects assigned to its category, and uses the command object to perform operations at the corresponding enterprise service API located on the server computer.

2. The system of claim 1 wherein the markup language commands are communicated as a source file, and wherein the client includes a parser that parses said source file to retrieve said markup language commands and communicate said markup language commands to said server.

3. The system of claim 1 wherein said command-line user interface communicates said markup language commands to the server computer via a wide area network or the Internet.

4. The system of claim 1 wherein said parser and said command processor comprise an engine that parses source files and generates commands.

5. The system of claim 1 wherein the markup language is JMSML.

6. The system of claim 1 wherein the source fife is an XML file.

7. A method of using a command-line interface with a mark-up language to abstract complexity of enterprise service application program interface (API) programming, comprising the steps of:

providing a server computer including a server processor and a plurality of enterprise service API for one of messaging, operation, administration and management monitoring;

providing a client computer including a processing device and a client operating thereon;

providing an application including a command-line user interface that executes on the client and that receives user input markup language commands including the name of at least one enterprise service API at the server computer, and operations to be performed therewith;

receiving said markup language commands at a client command processor, that validates the user input markup language commands and for each markup language command converts the markup language command into a command object for communication to a client command dispatcher, assigning each command object to one of a plurality of categories corresponding to the enterprise service API specified in the user input markup language commands; and communicating the command objects to a plurality of client processor modules, including a processor module specific to each category of enterprise service API, wherein each processor module receives the command objects assigned to its category, and uses the command object to perform operations at the corresponding enterprise service API located on the server computer.

8. The method of claim 7 wherein the markup language commands are communicated as a source file, and wherein the client includes a parser that parses said source file to retrieve said markup language commands and communicate said markup language commands to said command processor.

9. The method of claim 7 wherein said command-line user interface communicates said markup language commands to the server computer via a wide area network or the Internet.

10. The method of claim 7 wherein said parser and said command processor comprise an engine that parses source files and generates commands.

11. The method of claim 7 wherein the markup language is JMSML.

12. The method of claim 7 wherein the source file is an XML file.

13. A computer program product including a storage medium having instructions stored thereon, which when executed cause the computer to perform the steps of:

providing a server computer including a server processor and a plurality of enterprise service application program interface (API) for one of messaging, operation, administration and management monitoring;

providing a client computer including a processing device and a client operating thereon;

providing an application including a command-line user interface that executes on the client and that receives user input markup language commands including the name of at least one enterprise service API at the server computer, and operations to be performed therewith;

receiving said markup language commands at a client command processor, that validates the user input markup language commands, and, for each markup language command converts the markup language command into a command object for communication to a client command dispatcher;

assigning each command object to one of a plurality of categories corresponding to the enterprise service API specified in the user input markup language commands; and communicating the command objects to a plurality of client processor modules including a processor module specific to each category of enterprise service API, wherein each processor module receives the command objects assigned to its category, and uses the command object to perform operations at the corresponding enterprise service API located on the server computer.

* * * * *

UNITED STATES PATENT AND TRADEMARK OFFICE
CERTIFICATE OF CORRECTION

PATENT NO. : 7,290,248 B2
APPLICATION NO. : 10/601929
DATED : October 30, 2007
INVENTOR(S) : Sengodan It is certified that error appears in the above-identified patent and that said Letters Patent is hereby corrected as shown below:

On the Title Pg, on page 2, Item 56, under "Other Publications", line 17, delete "Overivew" and insert -- Overview --, therefor.

On the Title Pg, on page 2, Item 56, under "Other Publications", line 20, delete "java.sun.vom" and insert -- java.sun.com --, therefor.

On the Title Pg, on page 2, Item 56, under "Other Publications", line 16–17, delete "Middeleware" and insert -- Middleware --, therefor.

In column 3, line 2, delete "utilitizes" and insert -- utilizes --, therefor.

In column 3, line 46, delete "extensible" and insert -- eXtensible --, therefor.

In column 11, line 54, delete "Unsubscribe" and insert -- Unsubscribes --, therefor.

In column 12, line 37, delete "QoS" and insert -- QOS --, therefor.

In column 17, line 27, delete "MyJMServer1" and insert -- MyJMSServer1 --, therefor.

In column 17, line 40, delete "MyJMServer2" and insert -- MyJMSServer2 --, therefor.

In column 22, line 48, delete "an" and insert -- a --, therefor.

In column 22, line 52, delete "DE" and insert -- IDE --, therefor.

In column 24, line 66, after "the" delete "these".

In column 25, line 20, after "FIG. 11" insert -- , --.

In column 25, line 39, delete "comman" and insert -- command --, therefor.

In column 26, line 54, delete "are" and insert -- area --, therefor.

CERTIFICATE OF CORRECTION (continued)
U.S. Pat. No. 7,290,248 B2

In column 27, line 49, delete "Analyses" and insert -- Analysis --, therefor.

In column 32, line 29, delete "Rutime" and insert -- Runtime --, therefor.

In column 37, line 37, delete "Synchornous" and insert -- Synchronous --, therefor.

In column 38, line 61, delete "lndicates" and insert -- Indicates --, therefor.

Signed and Sealed this

Sixteenth Day of March, 2010

David J. Kappos
*Director of the United States Patent and Trademark Office*